United States Patent
Won et al.

(10) Patent No.: US 7,100,057 B2
(45) Date of Patent: Aug. 29, 2006

(54) METHOD AND DEVICE FOR RETRIEVING DATA IN LOW-POWER

(75) Inventors: Youjip Won, Scongnam-si (KR); Jungwan Choi, Seoul (KR)

(73) Assignee: Hanyang Hak Won Co. Ltd., (KR)

( * ) Notice: Subject to any disclaimer, the term of this patent is extended or adjusted under 35 U.S.C. 154(b) by 467 days.

(21) Appl. No.: 10/422,567

(22) Filed: Apr. 24, 2003

(65) Prior Publication Data

US 2004/0081045 A1    Apr. 29, 2004

(30) Foreign Application Priority Data

Oct. 25, 2002    (KR)  .................... 10-2002-0065513

(51) Int. Cl.
  *G06F 1/26* (2006.01)
  *G06F 1/32* (2006.01)
  *G11B 20/10* (2006.01)
(52) U.S. Cl. .................... 713/300; 713/320; 369/47.33
(58) Field of Classification Search ................ 713/300, 713/320; 369/44.27, 47.33
    See application file for complete search history.

(56) References Cited

U.S. PATENT DOCUMENTS 5,345,347 A * 9/1994 Hopkins et al. ............. 360/71
5,943,307 A * 8/1999 Takagi et al. ............ 369/47.33
6,088,809 A * 7/2000 Atkinson ..................... 713/324
6,332,175 B1 * 12/2001 Birrell et al. ................ 711/112
6,590,730 B1 * 7/2003 Veltchev et al. .............. 360/69
6,603,719 B1 * 8/2003 Wu ......................... 369/47.33
6,608,729 B1 * 8/2003 Willems et al. ............... 360/69
6,665,243 B1 * 12/2003 Kelly et al. ................ 369/47.5
6,747,933 B1 * 6/2004 Ueki ........................ 369/53.31

FOREIGN PATENT DOCUMENTS

| | | |
|---|---|---|
| JP | 1995-014290 | 1/1995 |
| JP | 1997-017099 | 1/1997 |
| JP | 1999-238314 | 8/1999 |
| JP | 1999-317000 | 11/1999 |
| JP | 2000-228053 | 8/2000 |

* cited by examiner

*Primary Examiner*—Thomas Lee
*Assistant Examiner*—Suresh K Suryawanshi
(74) *Attorney, Agent, or Firm*—Cantor Colburn LLP

(57) ABSTRACT

A method and device for retrieving data in low-power is provided. More specifically, it relates to a method and device for minimizing power consumption while retrieving the continuous media data from a disk drive for the purpose of real-time playback. The data reproducing device reproduces multimedia data by a determined playback strategy after it computes power consumption values according to various playback strategies and retrieves data from a storage medium by a playback strategy having the least power consumption by means of comparing respective power consumption values.

23 Claims, 18 Drawing Sheets

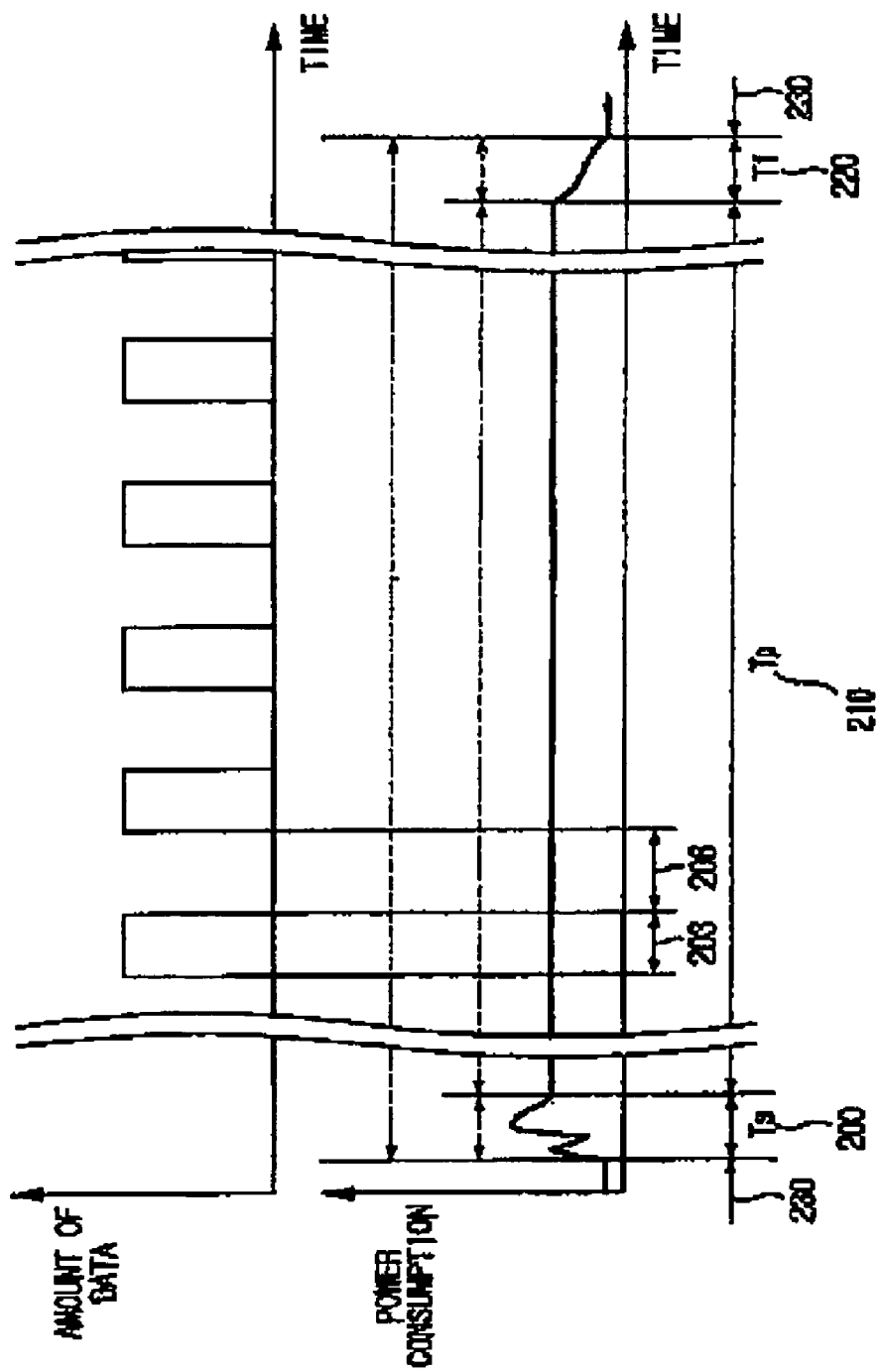

320

METHOD AND DEVICE FOR RETRIEVING DATA IN LOW-POWER

FIELD OF THE INVENTION

The present invention relates to a method and device for retrieving data in low-power. More specifically, it relates to a method and device for minimizing power consumption while retrieving continuous media data from a disk drive for the purpose of real-time playback.

BACKGROUND ART

In recent years, mobile reproducing devices, e.g., MP3 player, CD player and etc., have become quite popular and used widely. However, since available electric power for the mobile playback devices is restricted, various attempts to reduce power consumption for reproducing multimedia data have been tried. The method for reducing the power consumption and the problems of the conventional reproducing method will be explained below with reference to the drawings.

FIG. 1 is a block diagram showing the conventional method for reproducing data. Referring to FIG. 1, a reading part 110 reads data from a storage medium 100, e.g., optical disk, hard disk and etc., and an output part 120 reproduces the data. The data size read by the reading part 110 is decided by the performance of the mobile reproducing device. Also, the data size outputted by the output part 120 is decided by a playback rate. However, a problem arises because the data size read by the reading part 110 is greater than the data size outputted by the output part 120. Therefore, a buffer 115 is required to solve the problem based on the difference between the two numbers of data blocks. Also, the data is outputted from the buffer 115 regularly and stably, while the data read by reading part 110 may be irregular.

After the reading part 110 sends data to the buffer 115, the data reproducing method according to the conventional method continues to consume power because the spindle is still rotating at the full speed while the data filled in the buffer 115 are outputted.

Various approaches for solving the above-mentioned problems have been developed up to now. A typical approach to reduce the power consumption for a hard disk drive is to shutdown the disk when there are no outstanding I/O requests. That is, if no I/O requests are received during a predetermined time-out period of time, the reading part 110 reverts to stand-by mode in order to reduce power consumption.

However, in real-time playback, the effectiveness of the conventional power consumption reduction method by the time-out period of time is quite limited. Hereinafter, other problems according to the conventional power consumption reduction method will be described with reference to FIG. 2.

FIG. 2 is a schematic diagram showing the power consumption of a data read operation according to the conventional reproducing method.

The processing procedure of the reading part 110 includes a start-up mode 200, active mode 210, finish mode 220, and stand-by mode 230. The active mode 210 consists of read mode 203 and idle mode 206. Most of the power consumption occurs in the active mode 210.

The reading part 110 of the mobile reproducing device is initially in the stand-by mode 230. Although in the stand-by mode, the process moves into the start-up mode 200 when the I/O requests are received. The start-up mode 200 includes spin up, focus, and tracking as a preceding operation for retrieving data.

Further, the reading part 110 sends the data read from a disk to the buffer 115 in read mode 203, and then changes from the read mode 203 to idle mode 206. In the idle mode 203 where the reading part 110 waits until the predetermined data size from those data blocks filled in the buffer 115 are outputted through the output part 120, the disk head is in the parking position and the spindle is still rotating at the full speed.

If no request is received for a time-out period of time, the reading part 110 goes into finish mode 220 causing the platter to spin down and eventually going into stand-by mode 230. In the stand-by mode 230, the disk head is in the parking position and the spindle stops rotating.

However, because I/O requests are received during the time-out period of time according to the current reproducing device, power consumption is maintained in an active mode 210 until all data in a disk are read by the reading part 110 and outputted by the output part 120.

As mentioned above, the current data reading method goes into standby mode 230 if no I/O requests are received in the time-out period of time. Overhead regarding power consumption occurs in the idle mode 206 because most of the power consumption is done in active mode 210. Still, a method for minimizing power consumption is required because the size of the buffer is limited.

FIG. 3A is a graph showing the power consumption profile for an entire playback time period according to the conventional reproducing device, FIG. 3B is a graph showing the power consumption profile for start-up mode 200, and FIG. 3C is a graph showing the power consumption profile for finish mode 220.

FIG. 3A is a graph for showing the power consumption profile measured by an experiment. Also the playback duration of time consists of the startup mode 300, active mode 310, and finish mode 320.

The active mode 310 consists of a read mode 203 and an idle mode 206 according to the conventional reproducing method. Also, referring to FIG. 3A, there is little difference between the power consumption in the read mode 203 and the power consumption in idle mode 206. Therefore, the conventional power saving method is not effective.

Also, the conventional method (i.e., disk shut-down method) for minimizing power consumption by establishing a time-out period of time has a problem that the disk has to be rotating until all data in the disk are outputted if I/O requests are received. That is, until all data filled in the buffer 115 are outputted, the disk has to be rotating continuously in the idle mode 206 when the reading process is not executed. Therefore, unnecessary power consumption occurs.

As mentioned above, according to the conventional reproducing method, the conventional data reproducing device reproduces data filled in a buffer after it fills data in its buffer regardless of allotted buffer size and data size. Thereafter the process of filling the next data in the buffer and reproducing the next data is repeated whenever the buffer becomes empty. Accordingly, unnecessary power consumption occurs while data filling in the buffer are reproduced because the spindle is still rotating at the full speed during that period.

SUMMARY OF THE INVENTION

The present invention is devised to solve the above-mentioned problems.

One aspect of the present invention is to provide a method and device for minimizing power consumption while retrieving continuous media data from the disk drive for the purpose of real-time playback Another aspect of the present invention is to minimize the power consumption during unnecessary rotation of the disk because a data reproducing device reads data from a storage medium separately corresponding to playback rate, allotted buffer size, and data file size. That is, the data reproducing device according to the present invention saves power that would be consumed by the unnecessary rotation of the disk (i.e., idling), because the reading part goes into a stand-by mode after it reads data regarding size corresponding to an allotted buffer size and data file size, and then fills data in the buffer.

Still another aspect of the present invention is to provide a method and device for saving power consumption in the start-up mode 200 and finish mode 220 of the last round by means of merging the last round with its immediately preceding round.

Still another aspect of the present invention is to provide a method and device for achieving minimum power consumption when retrieving given multimedia data by selecting a data reproducing method with the minimum power consumption before it reproduces the multimedia data.

To achieve these aspects according to one exemplary embodiment of the present invention, a method for reproducing data in low-power is provided. The method for reproducing data in low-power comprises the steps of computing a first power consumption according to a Normal playback strategy including start-up mode, read mode, idle mode and finish mode, and a second power consumption according to a Full Buffering playback strategy including start-up mode, read mode and finish mode; retrieving data from a storage medium by a playback strategy having less power consumption by means of comparing the first power consumption according to the Normal playback strategy with the second power consumption according to the Full Buffering playback strategy; and reproducing the retrieved data.

In the Full Buffering playback strategy in order to retrieve data from a storage medium in a round on a data reproducing device having a buffer, the method for reproducing data in low-power comprises the steps of a) performing a preceding operation for retrieving data when a reproducing command is inputted; b) retrieving data from the storage medium; c) sending the retrieved data to a buffer; d) stopping the retrieving of data when the buffer becomes full; e) executing spin down; f) stopping rotating of a motor while the data filled in the buffer are reproduced; and g) requesting the reproducing command when the buffer becomes empty.

In the Full Buffering playback strategy in order to retrieve data from a storage medium in a round on a data reproducing device having a buffer group comprising a plurality of buffers, comprises the steps of a) performing a preceding operation for retrieving data when a reproducing command is inputted; b) retrieving data from the storage medium; c) sending the retrieved data to a first buffer selected from the buffer group while the first buffer becomes full; d) sending the retrieved data subsequently to any other buffer from the buffer group while the data filling the first buffer are reproduced; e) executing spin down if all of buffers in the buffer group become full; f) stopping rotating of a motor while an arbitrary buffer in the buffer group becomes empty; and g) requesting the reproducing command when the arbitrary buffer in the buffer group becomes empty.

The first power consumption according to the method for reproducing data in low-power is computed by the formula as defined below:

$$P_N = P_s P_f + \alpha \left( \frac{B^*}{R-r} + \frac{Lr-B}{r} \right)$$

where $P_N$ is power consumption according to Normal playback strategy, $P_s$ is power consumption in start-up mode, $P_f$ is power consumption in finish mode, $\alpha$ is power consumption rate in read mode, $B^*$ is buffer size, R is the maximum transfer rate from the storage medium, r is playback rate from a buffer, L is playback length, and B is the data size retrieved during a round.

The second power consumption according to the method for reproducing data in low-power is computed by the formula as defined below:

$$P_P = \frac{Lr}{\frac{B^*R}{R-r}} E\left( P_s + P_f + \alpha \frac{B^*}{R-r} \right) + (P_s + P_f + \alpha T_p')EI$$

where $P_p$ is power consumption according to Full Buffering playback strategy, $P_s$ is power consumption in start-up mode, $P_f$ is power consumption in finish mode, $\alpha$ is power consumption rate in read mode, $B^*$ is buffer size, R is the maximum transfer rate from the storage medium, r is playback rate from a buffer, L is playback length, $T_p'$ is the length of active mode in the last round and I is an index function which is 0 if the surplus equals zero (0) when L is divided by length of a round but 1 otherwise.

The data size retrieved during a single round, i.e., B, is computed by the formula as defined below:

$$B = \begin{cases} T_p ER, & \text{if } T_p D \frac{B^*}{R-r} \\ \frac{B^*}{R-r} R + \left( T_p - \frac{B^*}{R-r} \right) r, & \text{otherwise} \end{cases}$$

when $T_p$ is the length of active mode in each round, R is the maximum transfer rate from the storage medium, r is the playback rate from the buffer, and $B^*$ is the buffer size.

The data size retrieved during a single round, B is greater than the minimum data size retrieved during a round capable of being reproduced in low-power, i.e., $B_{min}$ computed by the formula as defined below:

$$B_{min} = \frac{(R-r)srs[T_s + T_f]}{R - 2r}$$

where R is the maximum transfer rate from the storage medium, r is playback rate from the buffer, $T_s$ is the length of start-up mode in each round, and $T_f$ is the length of finish mode in each round.

Also, the method for reproducing data in low-power further comprises the step of determining whether or not to merge the last round with any preceding round in a plurality of rounds.

The result of determining whether or not to merge the last round in a plurality of rounds with its preceding round is indicated by the sign of P* and computed by the formula as defined below:

$$P^* = P_s + P_f + \alpha\frac{B_1}{R} - \alpha\frac{B_1}{r}$$

where $B_1$ is the number of remaining data blocks retrieved in the last round.

The number of remaining data blocks retrieved in the last round, i.e., $B_1$, is computed by the formula defined below:

$$B_1 = Lr - N\frac{B^*}{R-r}R$$

where L is playback length, r is playback rate from the buffer, N is the number of rounds of the same length, B* is buffer size, and R is the maximum transfer rate from the storage medium.

The step of determining whether or not to merge the last round with any preceding round in a plurality of rounds comprises the steps of: counting the number of preceding rounds from the last round; computing the split data size by means of dividing the data size retrieved during a round by the number of preceding rounds; and retrieving data from the storage medium by merging the split amount of data with the preceding rounds, respectively.

To achieve these aspects according to another exemplary embodiment of the present invention, a device for producing data in low-power is provided. The device comprises a reading part for reading data from a storage medium, a buffer for temporarily storing the data received from said reading part, and an output part for reproducing the data stored in said buffer according to a predetermined playback rate.

To achieve these aspects according to still another exemplary embodiment of the present invention, a method for reproducing data stored in a storage medium in low-power is provided. The method comprises the steps of a) performing a preceding operation for retrieving data when a reproducing command is inputted; b) retrieving data from the storage medium; c) sending the retrieved data to a buffer; d) stopping the retrieving of data when the buffer becomes full; e) executing spin down; f) stopping rotating of a motor while the data filled in the buffer are reproduced; g) requesting the reproducing command when the buffer becomes empty; and h) repeating steps a)–g) by the number of rounds if a plurality of rounds exist.

A data size retrieved, B, in the step b) is computed by the formula as defined below:

$$B = \begin{cases} T_pER, & \text{if } T_pD\frac{B^*}{R-r} \\ \frac{B^*}{R-r}R + \left(T_p - \frac{B^*}{R-r}\right)r, & \text{otherwise} \end{cases}$$

where $T_p$ is the length of active mode in each round, R is the maximum transfer rate from the storage medium, r is the playback rate from the buffer, and B* is buffer size.

The data size retrieved during a single round, B is greater than the minimum data size retrieved during a round capable of being reproduced in low-power, power, $B_{min}$ computed by the formula as defined below:

$$B_{min} = \frac{(R-r)srs[T_s + T_f]}{R - 2r}$$

where R is the maximum transfer rate from the storage medium, r is playback rate from the buffer, B* is buffer size, $T_s$ is the length of start-up mode in each round, and $T_f$ is the length of finish mode in each round.

The power consumption according to the method for reproducing data is computed by the formula as defined below:

$$P_P = \frac{Lr}{\frac{B^*R}{R-r}}E\left(P_s + P_f + \alpha\frac{B^*}{R-r}\right) + (P_s + P_f + \alpha T_p')EI$$

where $P_p$ is power consumption according to Full Buffering playback strategy, $P_s$ is power consumption in start-up mode, $P_f$ is power consumption in finish mode, α is power consumption rate in read mode, B* is buffer size, R is the maximum transfer rate from the storage medium, r is playback rate from the buffer, L is playback length, $T_p$ is the length of active mode in the last round, and I is an index function which is 0 if the surplus equals zero (0) when L is divided by the length of a round but 1 other wise.

In the Full Buffering playback strategy as the method for reproducing data, the method further comprises the step of determining whether or not to merge the last round with any preceding round in a plurality of rounds.

The result of determining whether or not to merge the last round in a plurality of rounds with its preceding round is indicated by the sign P* and computed by the formula as defined below:

$$P^* = P_s + P_f + \alpha\frac{B_1}{R} - \alpha\frac{B_1}{r}$$

where $B_1$ is the number of remaining data blocks retrieved in the last round.

The number of remaining data blocks retrieved in the last round, $B_1$, is computed by the formula as defined below:

$$B_1 = Lr - N\frac{B^*}{R-r}R$$

Where L is playback length, r is playback rate from the buffer, N is the number of rounds of the same length, B* is buffer size, and R is the maximum transfer rate from the storage medium.

The step of determining whether or not to merge the last round with any preceding round in a plurality of rounds comprises the steps of counting the number of preceding rounds from the last round; computing the split data size by means of dividing the data size retrieved during a round by the number of preceding rounds; and retrieving data from the storage medium by merging the split amount of data with the preceding rounds, respectively.

The method for reproducing data removes the idle mode by means of setting a time-out value as zero.

BRIEF DESCRIPTION OF THE DRAWINGS

The drawings are as follows:

FIG. 2 is a schematic diagram showing the power consumption of data read operation according to the conventional reproducing method;

DETAILED DESCRIPTION

The embodiments of the method and device for retrieving data in low-power according to the present invention will be described with reference to the drawings.

Figure 1:
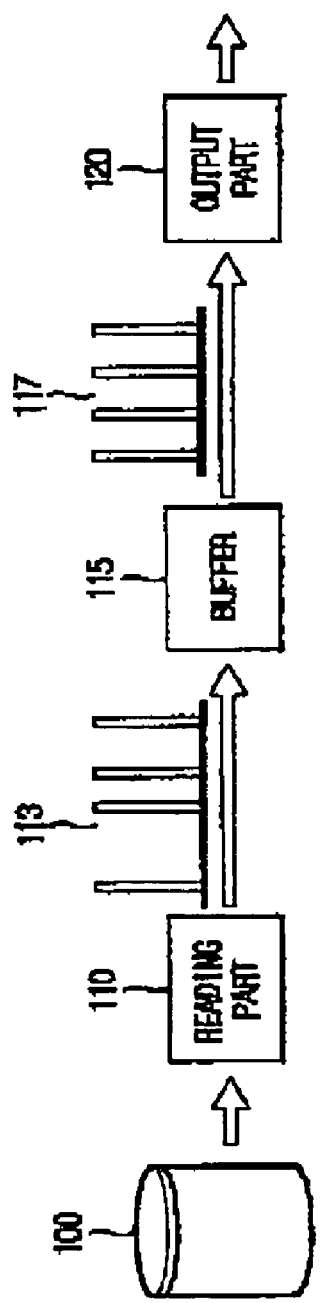
FIG. 1 is a block diagram showing the conventional method for reproducing data.
Figure 3A:
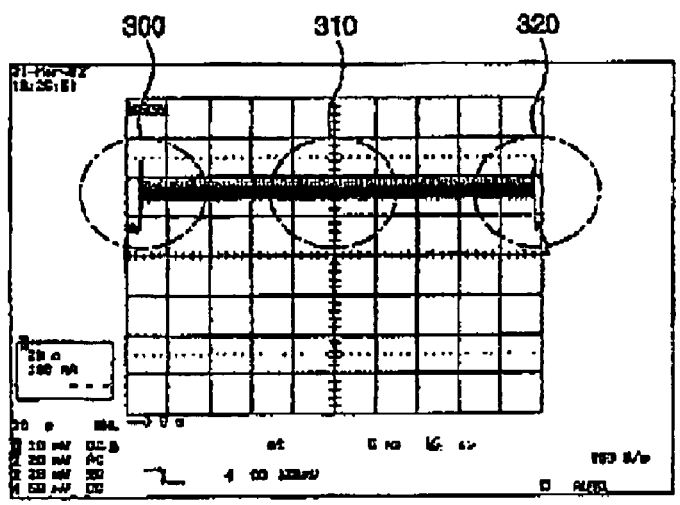
FIG. 3A is a graph showing the power consumption profile for an entire playback time period according to the conventional reproducing device.
Figure 3B:
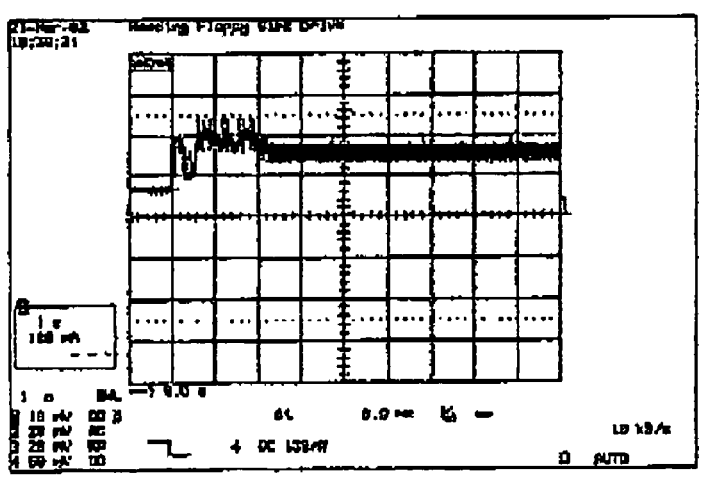
FIG. 3B is a graph showing the power consumption profile for start-up mode 200.
Figure 3C:
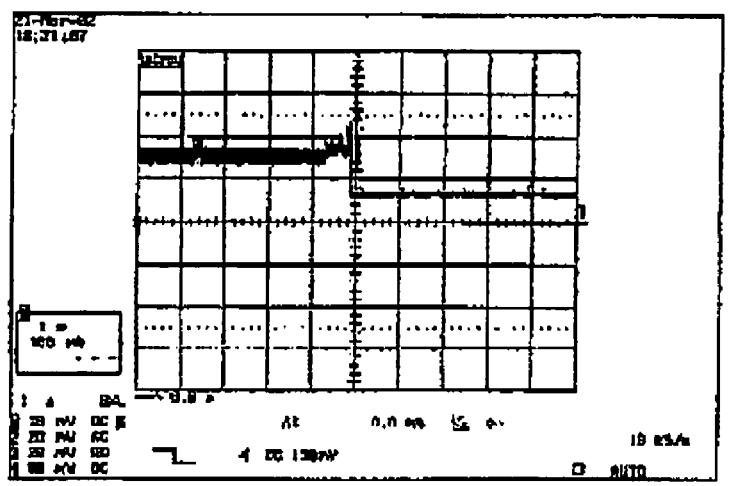
FIG. 3C is a graph showing the power consumption profile for finish mode 220.
Figure 4A:
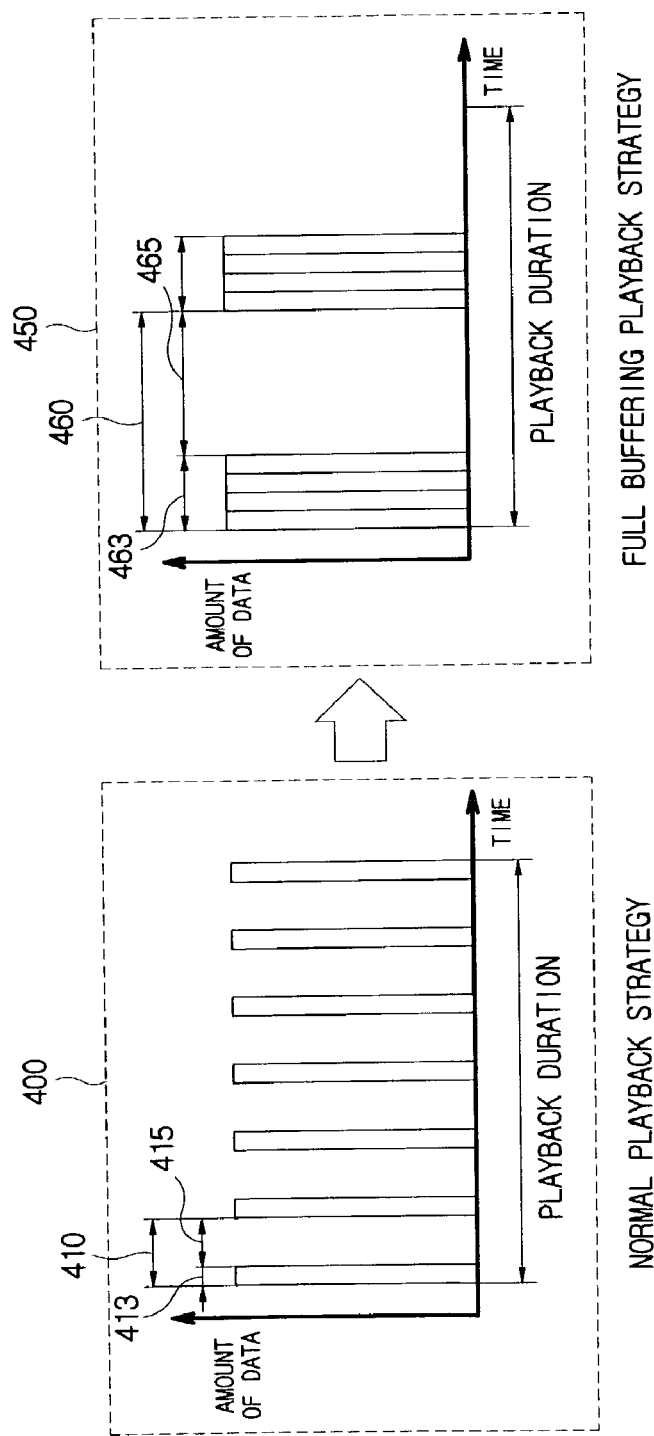
FIG. 4A is a block diagram showing the data reproducing method consistent with the principles of the present invention.
Figure 4B:
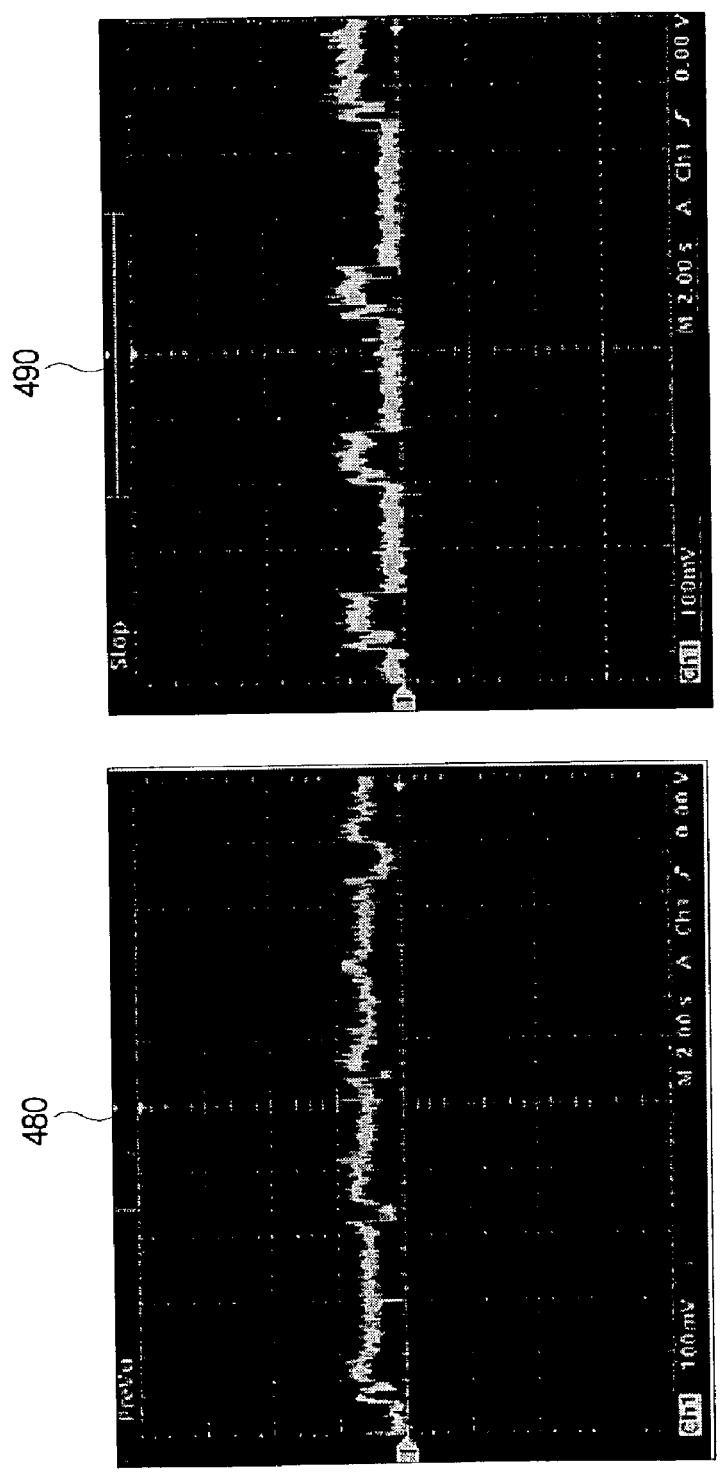
FIG. 4B is a graph showing the power consumption profile consistent with the principles of data reproducing methods of the present invention.

FIG. 4A is a block diagram showing the data reproducing method consistent with the principles of the present invention, and FIG. 4B is a graph showing the power consumption profile consistent with the principles of data reproducing methods of the present invention.

The data reproducing methods of the present invention include Normal playback strategy and Full Buffering playback strategy. Furthermore, the device according to present invention can reproduce data by the one playback strategy that has less power consumption compared with the two play back strategy.

The data retrieval method according to Normal playback strategy and Full Buffering playback strategy will be explained below with reference to the FIG. 4A.

Normal playback strategy 400 means the conventional method for reproducing data in real-time. The best way for minimizing power consumption is to use a buffer 115 to fill the data due to the difference between the time for reading data from a disk and the time for outing the read data. Generally, however, the buffer 115 has an upper limit of size. Therefore, in order to reproduce data in real-time, a reading part 110 in the device reads the data corresponding to the buffer size, sends the data to the buffer 115, and waits until the data filled in the buffer 115 are outputted by an output part 120. Upon outputting the predetermined size of data filled in the buffer 115, the reading part 110 repeats the above-mentioned process. The buffer 115 may be a buffer group comprising a plurality of buffers. If the buffer 115 is replaced with the buffer group, the reading part can send the data to any other buffer selected from the buffer group after one buffer becomes full. Therefore, a data reproducing device can continuously retrieve the data from a storage medium while all of buffers in the buffer group become full.

In Normal playback strategy, the entire playback is made up of a sequence of rounds. Each round 410 in an active period consists of a read mode 413 and an idle mode 415. That is, in Normal playback strategy, after the reading part 110 reads data from a disk and fills the data in the buffer 115, the reading part 110 remains in the idle mode 415 (i.e., idling state) until the buffer 115 has space to be filled due to outputting the data by the output part 120.

Another way of retrieving the multimedia data is Full Buffering playback strategy. In Full Buffering playback strategy 450, the entire playback time period is made up of a sequence of rounds. Each round 460 consists of read mode 463 and stand-by mode 465. Both of the ends of the read mode 463 are start-up mode and finish mode, not shown in FIG. 4A. That is, each round 460 consists of active mode and stand-by mode 465, and the active mode consists of start-up mode, read mode 463, and finish mode. In Full Buffering playback strategy, the device reads the data blocks of a disk until the buffer 115 is full and immediately goes into stand-by mode 465 in order to prevent unnecessary power consumption from occurring in the idle mode 415.

In Full Buffering playback strategy, the device goes into stand-by mode 465 when the buffer becomes full. Also the device remains in the stand-by mode 465 instead of the idle mode until the buffer becomes empty as much as possible corresponding to the playback rate. However, in Normal playback strategy, the power consumption rate converges to the power consumption rate of the read mode 413 because the stand-by mode does not exist.

The data reproducing device according to the present invention can reproduce multimedia data by the above-mentioned two playback strategies. Also, the data reproducing device can choose one playback strategy that has less power consumption, and reproduce multimedia data by the chosen playback strategy.

Hereinafter, one round 410, 460 is defined as a cycle that a reading part reads data from a disk to send the data to the buffer and waits until the reading part reads any other data again. Also the round 410, 460 consists of a step for reading data (hereinafter referred to as active mode 413, 416) and a step for waiting until the buffer becomes empty (hereinafter referred to as inactive mode 415, 465).

As mentioned above the Normal playback strategy, as a conventional data reproducing method, consists of a start-up mode, a plurality of rounds, a finish mode, and a stand-by mode. Each of the rounds includes a read mode and an idle mode. In the Normal playback strategy 400, power consumption occurs because the spindle is still rotating at full speed during the inactive mode 415.

In the Normal playback strategy 400, normal overhead power consumption still occurs in idle mode 415. On the other hand, in the Full Buffering playback strategy 450, normal overhead power consumption occurs in both ends of the read mode 463 (i.e., start-up mode and finish mode) in spite of removing the idle mode 415.

In contrast, according to the present invention, when the device reproduces multimedia data from a storage medium, it reproduces multimedia data for hours with limited power by minimizing normal overhead power consumption.

That is, according to present invention, the device can reproduce via a data reproducing method that consumes minimal power because it computes the respective power consumption and chooses one data reproducing method consuming less power consumption. When the respective power consumption is computed, the size of allotted buffer and size of multimedia data are taken into account.

Also, if data fill the buffer in a series of rounds, the device according to the present invention can determine the remaining data block filled in the last round whether to read the remaining data blocks in the current round or in the separate round according to the size of the remaining data block.

FIG. 4B is a graph showing the power consumption profile consistent with the principles of data reproducing methods of the present invention.

Referring to the power consumption profile 480 according to the Normal playback strategy, there is little difference between the power consumption of the read mode and the power consumption of the idle mode. Therefore, if the idle mode is removed, the power consumption can be effectively reduced.

On the other hand, referring to the power consumption profile 490 according to the Full Buffering playback strategy, the power is consumed in the read mode 463 but rarely consumed in the stand-by mode 465. Therefore, in the Full Buffering playback strategy 450, the power to reproduce multimedia data can be minimized if the device computes the most suitable size of readable data in a round regarding buffer size, transfer rate from disk, playback rate, etc., reads the most suitable size of readable data, computes the longest period for the inactive mode 465, and stops rotation of the disk during this period. In the Full Buffering playback strategy, it is possible that the device retrieves the data block in a more forceful manner and goes into stand-by mode instead of an idle mode by using the buffer size fully. That is, the Full Buffering playback strategy can minimize unnecessary power consumption by going into stand-by mode immediately without time-out value.

Figure 5A:
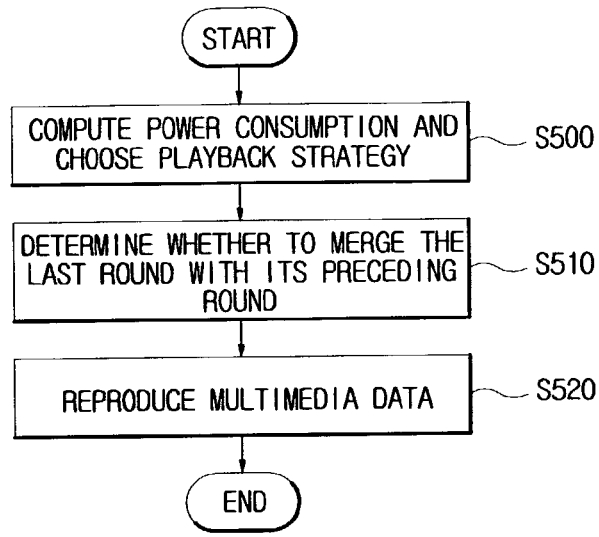
FIG. 5A is a flow diagram showing the steps of data reproducing method consistent with the principles of the present invention.
Figure 5B:
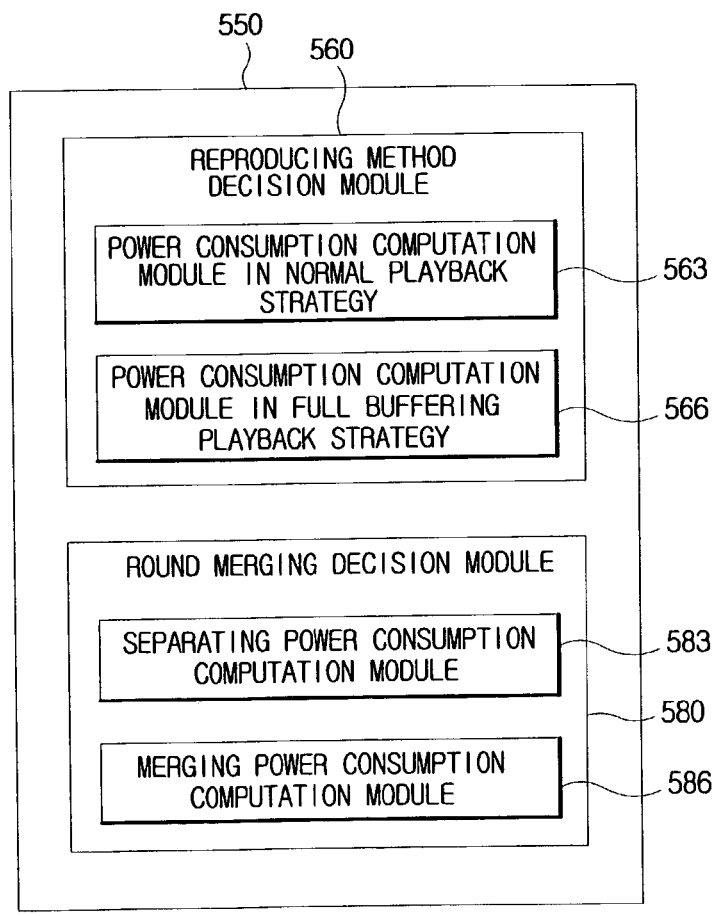
FIG. 5B is a diagram showing a function module of the data reproducing device consistent with the principles of the present invention.

FIG. 5A is a flow diagram showing the steps of a data reproducing method consistent with the principles of the present invention, and FIG. 5B is a diagram showing a function module of the data reproducing device consistent with the principles of the present invention.

As mentioned above, the data reproducing methods according to the present invention include Normal playback strategy (i.e., conventional reproducing method) and Full Buffering play back strategy (i.e., the data reproducing method in low-power).

In general, the power for reproducing multimedia data changes by various parameters, e.g. performance of data reproducing device, data size to be reproduced, etc. That is, according to the reproducing environment, the Normal playback strategy may result in less power consumption or the Full Buffering playback strategy may result in less power consumption. Therefore, the device can compute power consumption in order to choose the best reproducing method before the reproducing of multimedia data commences.

The data reproducing method performed by the data reproducing device according to the present invention will be explained below with reference to FIG. 5A and FIG. 5B.

The data reproducing device computes the power consumption according to the Normal playback strategy and the Full Buffering playback strategy, and then chooses one playback strategy having the least power consumption value (step. 500).

Referring to FIG. 5B, a reproducing method decision module 560 comprises a first power consumption computation module 563 for computing the power consumption value according to the Normal playback strategy and a second power consumption computation module 566 for computing the power consumption value according to the Full Buffer playback strategy.

The first power consumption computation module 563 computes the first power consumption value according to Normal playback strategy by formula (1) and (2) (formula (1) and (2) will be shown and explained below with reference to FIG. 6A and FIG. 6B).

The second power consumption computation module 566 computes the second power consumption value according to Full Buffer playback strategy by formula (3) and (4) (formula (3) and (4) will be shown and explained below with reference to FIG. 6A and FIG. 6B).

Thereafter, the data reproducing device compares the first power consumption value with the second power consumption value, chooses one playback strategy (i.e., data reproducing method) having the least power consumption value, and reproduces multimedia data by the chosen data reproducing method.

Turning now to the FIG. 5A, at step 500, if Full Buffering playback strategy is chosen, the data reproducing device determines whether to merge the last round with its immediately preceding round or not (step 510).

Referring to FIG. 5B, a round merging decision module 580 comprises a separating power consumption computation module 583 and a merging power consumption computation module 586. The separating power consumption computation module 583 computes the power consumption when the last round is not merged with its immediately preceding round. The merging power consumption computation module 586 computes the power consumption when the last round is merged with its immediately preceding round.

In Full Buffering playback strategy, the above-mentioned normal overhead power consumption occurs in the start-up mode and the finish mode in every round.

Therefore, if the device compares normal overhead power consumption when merging the last round with it upon separating the last round and chooses one playback strategy having the least normal overhead power consumption, the unnecessary power consumption in the last round can be minimized.

According to a further embodiment of the present invention, the merging power consumption computation module 586 can determine whether to merge the last round with its immediately preceding round or not by formula (7) instead of computing respective power consumption of each case. Hereinafter, the data reproducing method for determining whether or not to merge the last round with its immediately preceding round with the merging power consumption computation module 586 is defined as Adaptive Round Merge (ARM).

At step 520, the data reproducing device reproduces multimedia data by using the determined playback strategy.

Figure 5C:
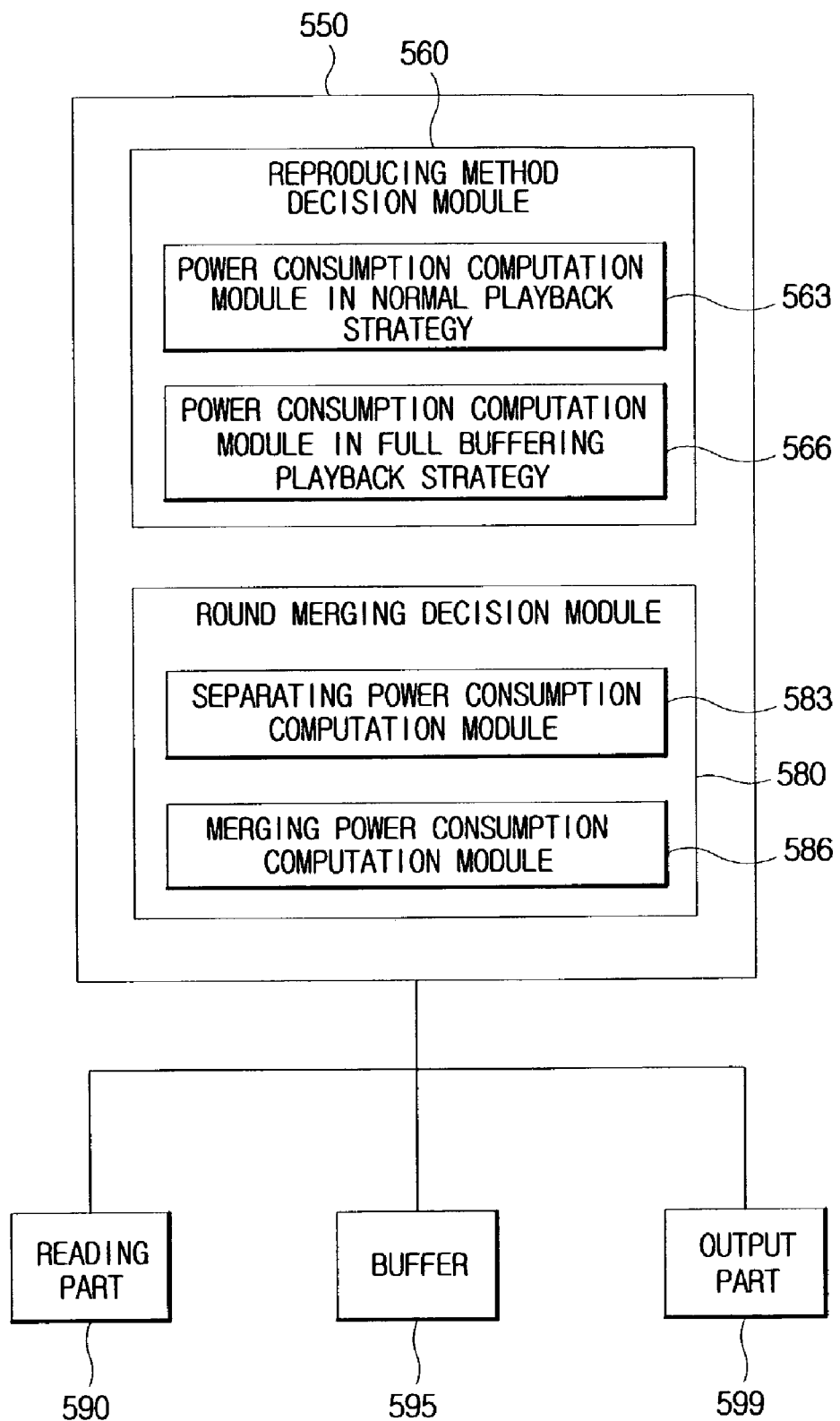
FIG. 5C is a block diagram showing the structure of the data reproducing device consistent with the principles of the present invention.

FIG. 5C is a block diagram showing the structure of the data reproducing device consistent with the principles of the present invention.

Referring to FIG. 5C, the data reproducing device comprises a control part 550, a reading part 590, a buffer 595, and an output part 599.

The control part 550 comprises a central processing unit (CPU) and memory. Also the memory stores program codes for the reproducing method decision module 560 (shown in FIG. 5B) and the round merging decision module 580 (shown in FIG. 5B). The control part 550 controls the reading part 590, the buffer 595, and the output part 599 in order to reproduce data stored in a storage medium by a determined playback strategy in real-time.

The reading part 590 reads data from a storage medium by a determined playback strategy and sends the data to the buffer 595. The buffer 595 stores temporarily the data received from the reading part 590, and then sends the data to the output part 599. The output part 599 converts the data received from the buffer 595 to audio or video signals capable of being perceived by a user and outputs the converted data.

Figure 6A:
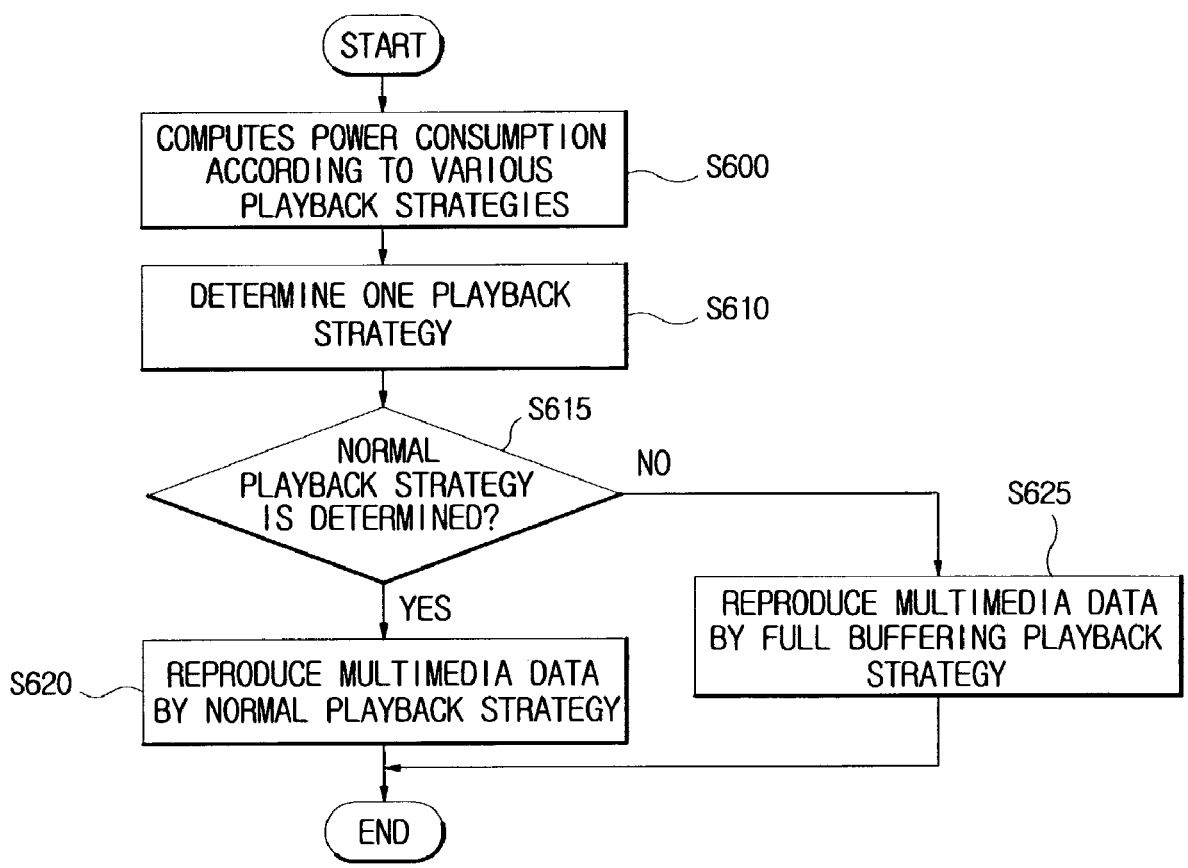
FIG. 6A is a flow diagram showing the steps of determining playback strategy consistent with the principles of the present invention.
Figure 6B:
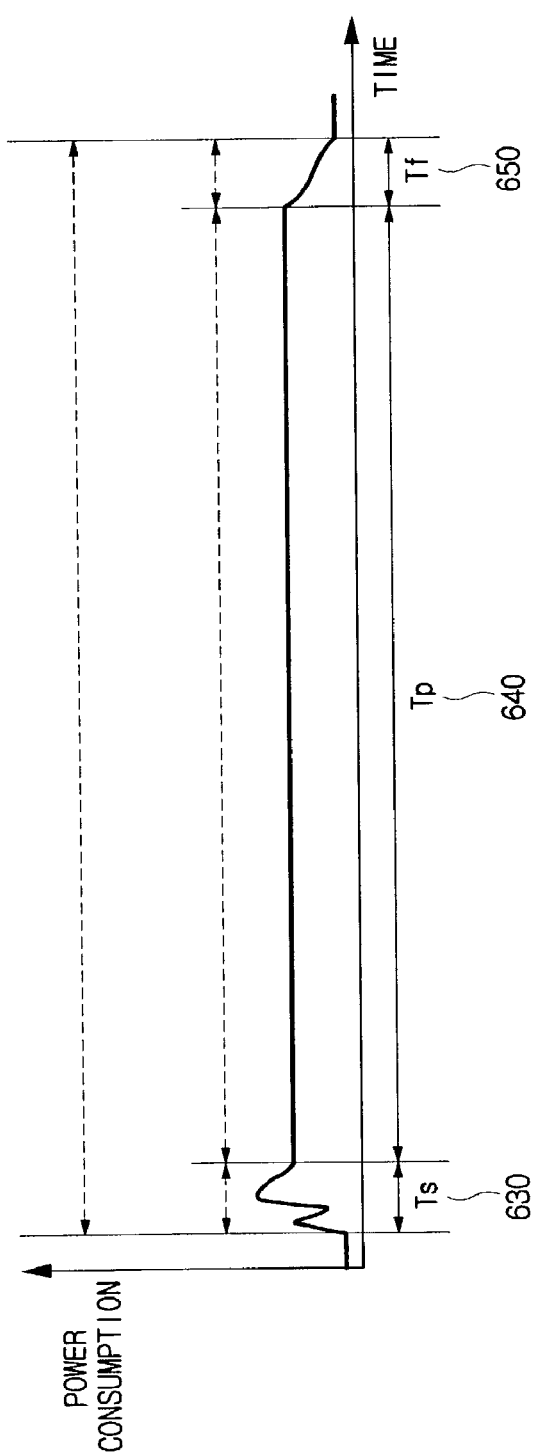
FIG. 6B is a graph showing the power consumption profile in Normal playback strategy consistent with the principles of the present invention.
Figure 6C:
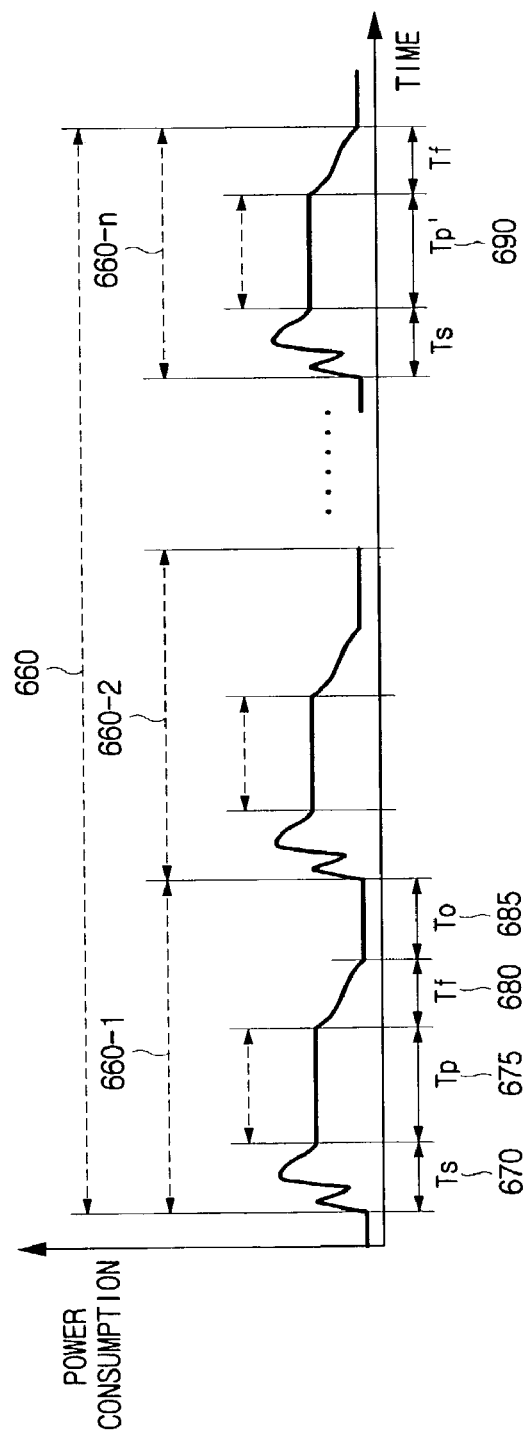
FIG. 6C is a graph showing the power consumption profile in Full Buffering playback strategy consistent with the principles of the present invention.

FIG. 6A is a flow diagram showing the steps of determining a playback strategy consistent with the principles of the present invention, FIG. 6B is a graph showing the power consumption profile in Normal playback strategy consistent with the principles of the present invention, and FIG. 6C is a graph showing the power consumption profile in Full Buffering playback strategy consistent with the principles of the present invention.

Hereinafter, the method for determining playback strategy will be explained below, referring to FIGS. 6A, 6B and 6C.

At step 600, the data reproducing device computes the power consumption according to both Normal playback strategy and Full Buffering playback strategy.

Symbols used in respective formulas for computing power consumption are defined in the table below;

| Unit | Symbol | Description |
|---|---|---|
| Transfer rate | R | Maximum transfer rate from disk |
|  | r | playback rate |
| Data | $D_t$ | Total data |
|  | $D_r$ | Remaining data |

-continued

| Unit | Symbol | Description |
|---|---|---|
|  | B* | Buffer size |
|  | B | Data size retrieved during a round |
|  | $B_{min}$ | Minimum data size retrieved during a round capable of being reproduced in low-power |
| Length | L | Length of a round |
|  | $T_s$ | Length of start-up mode in each round |
|  | $T_f$ | Length of finish mode in each round |
|  | $T_p$ | Length of active mode in each round |
|  | $T_p'$ | Length of active mode in the last round |
|  | $T_o$ | Length of stand-by mode in each round |
| Power | $P_s$ | Power consumption in start-up mode |
|  | $P_f$ | Power consumption in finish mode |
|  | $P_a$ | Power consumption in active mode |
| Rate | α | Power consumption rate in read mode |

Hereinafter and upon referring to FIG. 6B and FIG. 6C, the power consumption according to each respective playback strategy will be explained using the symbols in the above table. Firstly, the power consumption according to Normal playback strategy will be explained with reference to FIG. 6B.

Referring to FIG. 6B, the Normal playback strategy includes start-up mode 630, active mode 640, and finish mode 650. The active mode 640 comprises several rounds consisting of read mode and idle mode (not shown in FIG. 6B). The difference between the power consumption in read mode and the power consumption in idle mode is negligible.

Therefore, the total power consumption in Normal playback strategy can be calculated in formula (1) below as follows:

$$P_N = P_s + P_f + P_a = P_s + P_f + \alpha T_p \qquad (1)$$

That is, the total power consumption in Normal playback strategy, $P_N$, is the sum of the power consumption in start-up mode 630, $P_s$, the power consumption in active mode 640, $P_a$, and the power consumption in finish mode 650, $P_f$. The power consumption in active mode 640, $P_a$, can be obtained by multiplying the power consumption rate in read mode, α, by the length of active mode in each round, $T_p$. The length of active mode in each round, $T_p$, corresponds to $$\frac{B^*}{R-r} + \frac{Lr-B}{r}.$$

This is because the maximum transfer rate from a disk, R, is bounded by the playback rate, r, once the buffer is full. Therefore, the formula (1) can be expressed as formula (2) below as follows:

$$P_N = P_s + P_f + \alpha\left(\frac{B^*}{R-r} + \frac{Lr-B}{r}\right) \qquad (2)$$

The power consumption according to Full Buffering playback strategy will be explained with reference to FIG. 6C.

FIG. 6C is a graph showing the power consumption profile in Full Buffering playback strategy consistent with the principles of the present invention.

In the Full Buffering playback strategy, the entire playback is made up of a sequence of rounds 660-1, 660-2, . . . , 660-n. Each round comprises start-up mode 670, reading mode 675, finish mode 680, and stand-by mode 685, instead of an idle mode. Also, after the length of time of the stand-by mode in current round, $T_o$ has passed, the next round starts. The Full Buffering playback strategy reduces power consumption of an idle mode by eliminating the idle mode.

That is, in the Full Buffering playback strategy, if the buffer satisfies the predetermined condition by means of reproducing the data filled in the buffer by output means, the reading part reads data, sends the data, and then goes into stand-by mode without time-out. The predetermined condition can be set by predetermined time and so on. The reading part remains in the stand-by mode until the buffer satisfied the predetermined condition. Thereafter, if the buffer satisfies the predetermined condition again, the reading part goes into read mode in order to read data.

Also, the total power consumption in Normal playback strategy can be obtained by formula (3) below:

$$P_P = NE(P_s + P_f + \alpha T_p) + (P_s + P_f + \alpha T_p')EI \qquad (3)$$

wherein N denotes the number of rounds of the same length and $T_p'$ denotes the length of active mode in the last round. I is an index function, which is 0 if the surplus equals zero (0) when playback length, L, is divided by T 660-1 but 1 other wise. If playback length, L, is an integer multiple of T, i.e. I equals zero, the Full Buffering playback strategy requires the minimum power consumption.

In the Full Buffering playback strategy, the length of active mode in each round, $T_p$ 675, corresponds to $$\frac{B^*}{R-r}.$$

Also the number of rounds of the same length, N, can be represented as $$\left\lfloor \frac{Lr}{\frac{B^*R}{R-r}} \right\rfloor$$

Therefore, the above formula (3) can be represented as formula (4) below:

$$P_P = \left\lfloor \frac{Lr}{\frac{B^*R}{R-r}} \right\rfloor E\left(P_s + P_f + \alpha \frac{B^*}{R-r}\right) + (P_s + P_f + \alpha T_p')EI \qquad (4)$$

As mentioned above, before multimedia data are produced, the data reproducing method according to the present invention can have the power consumption value of the Normal playback strategy using formulas (1) and (2) with various parameters, e.g., data size, buffer size, etc. Also, the data reproducing method according to the present invention can have the power consumption value in the Full Buffering playback strategy using formulas (3) and (4) with various parameters At step 610, the data reproducing device compares with respective power consumption values and determines one playback strategy having the minimum power consumption value. Then the data reproducing device examines if Normal playback strategy is determined (step 615).

If the Normal playback strategy is determined by the examination result of step 615, the data reproducing device reproduces the multimedia data by the Normal playback strategy (step 620).

Contrarily if the Normal playback strategy is not determined by the examination result of step 615, the data reproducing device reproduces the multimedia data by the Full Buffering playback strategy (step 625).

From a different point of view, the power consumption can be reduced with the minimum data size retrieved during a round capable of being reproduced in low-power, $B_{min}$. However, $B_{min}$ must comply with the requirement as $$T > T_s + T_f + \frac{B}{R-r}$$

and TEr<B . Therefore, $B_{min}$ can be computed by formula (5) below:

$$B_{min} = \frac{(R-r)SrS[T_s + T_f]}{R - 2r} \qquad (5)$$

If memory size corresponding to $B_{min}$ from the total memory size of the data reproducing device is set as a buffer size, the data reproducing device can use the balance of the memory size effectively for more efficient improvement, multi-tasking, and so on because the amount of usable memory size is increased.

Figure 7A:
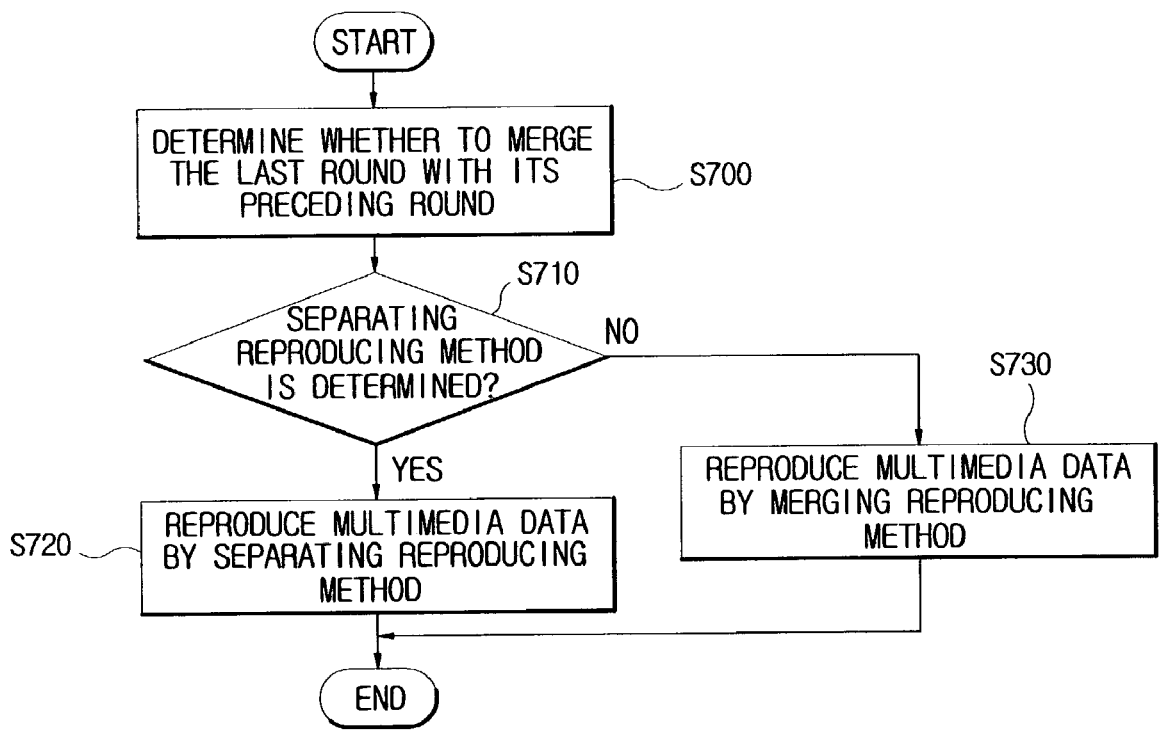
FIG. 7A is a flow chart showing the steps of determining whether or not to merge the last round with its immediately preceding round consistent with the principles of the present invention.
Figure 7B:
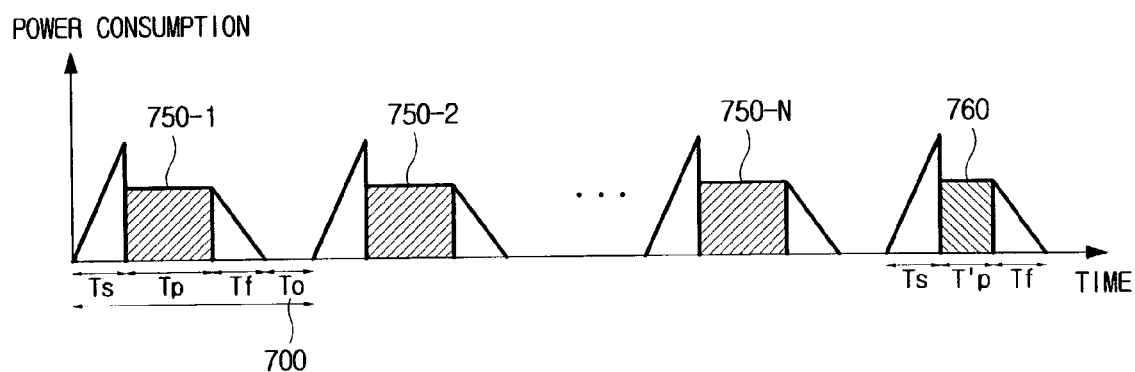
FIG. 7B is a graph showing the power consumption profile when not merging the last round with its immediately preceding round consistent with the principles of the present invention.
Figure 7C:
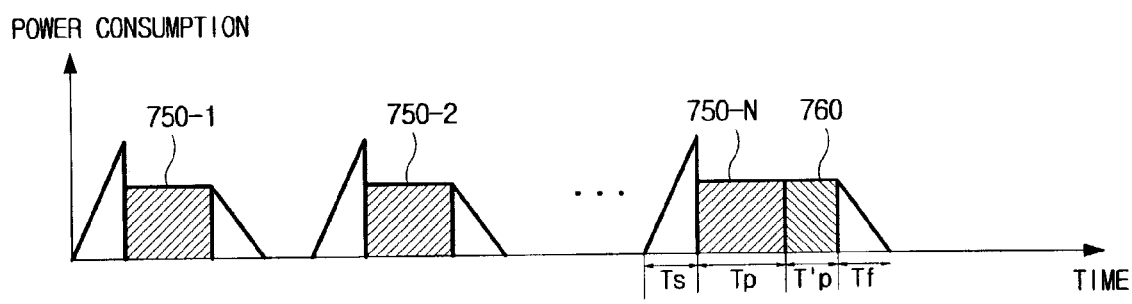
FIGS. 7C and 7D are graphs showing the power consumption profile when merging the last round with its immediately preceding round consistent with the principles of the present invention.
Figure 7D:
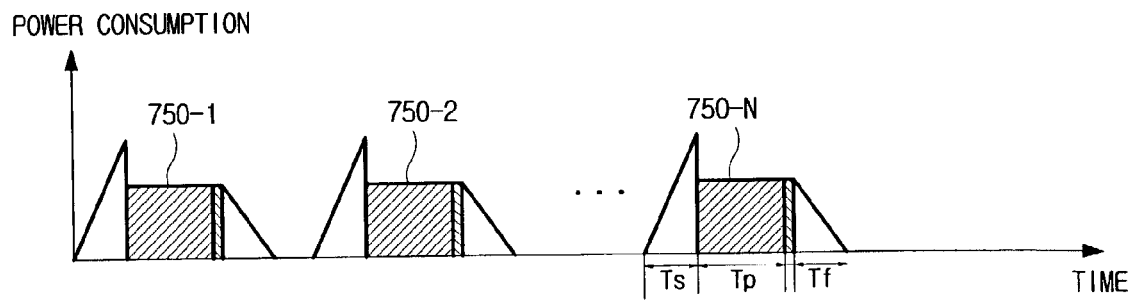

FIG. 7A is a flow chart showing the steps of determining whether or not to merge the last round with its immediately preceding round consistent with the principles of the present invention. FIG. 7B is a graph showing the power consumption profile when the last round is not merged with its immediately preceding round consistent with the principles of the present invention. FIG. 7C and 7D are graphs showing the power consumption profile when the last round is merged with its immediately preceding round consistent with the principles of the present invention.

The Full Buffering playback strategy is a data reproducing method for minimizing power consumption by fully utilizing the buffer size. That is, in the Full Buffering playback strategy, the data reproducing device stops reading when the buffer is full and then goes into a stand-by mode an instead of idle mode. This is because efficiency of the power consumption is significantly degraded when the disk continues reading after the buffer is full. However, in the last round, it is preferable to determine whether to read the remaining data blocks in the current round or in a separate round (i.e., go into stand-by mode) by the amount of remaining data. In the Full Buffering playback strategy, the data reproducing device can reduce power consumption in both the start-up mode and finish mode of the last round because restarting another round includes the start-up mode and the finish mode which are normal overhead costs.

Hereinafter, the method of merging the last round with its immediately preceding one is referred to as a merging reproducing method, and the method of separating the last round from its immediately preceding one is referred to as a separating reproducing method.

In the Full Buffering playback strategy, the steps of determining whether to merge the last round with its immediately preceding round or not will be explained with reference to FIG. 7A through FIG. 7D.

At step 700, the data reproducing device computes the respective power consumption values according to Normal playback strategy and Full Buffering playback strategy, and then determines whether to merge the last round with its immediately preceding round or not.

Prior to computing the respective power consumption according to the respective reproducing method, the data reproducing device computes the size of readable data in a round. The length of stand-by mode in each round, $T_o$, can be computed as $$\frac{B}{r} - (T_s + T_s + T_p).$$

It takes $$\frac{B^*}{R-r}$$

to fill the empty buffer. Once the buffer is full, because the transfer rate from the disk is bounded by the playback rate, the data size read during the length of active mode in each round, $T_p$, can be represented as formula (6) below:

$$B = \begin{cases} T_p ER, & \text{if } T_p D \frac{B^*}{R-r} \\ \frac{B^*}{R-r} R + \left(T_p - \frac{B^*}{R-r}\right) r, & \text{otherwise} \end{cases} \quad (6)$$

Let B be the data size retrieved during a round. Then, the amount of remaining data blocks read in the last round, $B_1$ corresponds to LEr-NEB Therefore, in separating the reproducing method, the power consumption in the last round corresponds to $$P_s + P_f + \alpha \frac{B_1}{R}.$$

Also, in merging the reproducing method, the data reproducing device reduces the power consumption of the start-up mode and the finish mode. However, the read mode in the preceding round is extended by $$\frac{B_1}{r}$$

and additional power consumption, $$\alpha \frac{B_1}{r}$$

occurs.

The function, P* to determine whether or not to merge the last round with its immediately preceding round or is expressed as formula (7) below:

$$P^* = P_s + P_f + \alpha \frac{B_1}{R} - \alpha \frac{B_1}{r} \quad (7)$$

In formula (7), the power consumption in the last round by separating the reproducing method corresponds to $$P_s + P_f + \alpha \frac{B_1}{R},$$

and the power consumption in the last round by merging the reproducing method corresponds to $$\alpha \frac{B_1}{r}.$$

If P* is a negative number, the number of remaining data blocks read in the last round, $B_1$ is retrieved in the separate round as shown in FIG. 7B. Otherwise, the last round merges with the preceding one as shown in FIG. 7C and FIG. 7D.

Referring to FIG. 7B, a plurality of rounds comprises a plurality of rounds (750-1, 750-2, . . . , 750-N) having the same length of each round and the last round. Also, in order to reduce overhead costs in the start up mode and the finish mode of the last round, the data reproducing device can retrieve by merging the last round with its preceding rounds as shown in FIG. 7C and FIG. 7D.

The data reproducing device can merge the data blocks in the last round with its immediately preceding round (i.e., N-th round 750-N) referring to FIG. 7C as well as any round from a plurality of preceding rounds (750-1, 750-2, . . . , 750-N).

Also, as shown in FIG. 7D, after the data reproducing device splits the data blocks in the last round into N numbers (i.e., the number of preceding rounds), it can merge the split respective data blocks with a plurality of preceding rounds respectively in order to prevent the last round from remaining.

Turning to the FIG. 7A, at step 710, the data reproducing device examines if a separating reproducing method is determined.

If the separating reproducing method is determined by an examination result of step 710, the data reproducing device reproduces multimedia data by the separating reproducing method (step 720).

To the contrary if a merging reproducing method is determined by examination result of step 710, the data reproducing device reproduces multimedia data by the merging reproducing method (step 730). As above mentioned, the data block in the last round is merged with any round from a plurality of preceding rounds (i.e., N-th round 750-N) or all preceding rounds (750-1, 750-2, . . . , 750-N).

The adaptive merge algorithm, i.e., the steps of determining whether to merge the last round with its preceding round or not, is illustrated below:

```
Algorithm : Power-Conscious Playback( ){
    Rem=Datasize; compute N; compute P_N; compute P_F; compute P*;
    IF(PN ≦PP) {
        while(!EOF)
            EOF = read(file, B);
        finish( );
    }
    else {
        while(!EOF) {
            read(file, B);
            B_next = Rem - B;
            if(Bnext < B and P* < 0)
                EOF = read(file, B_next);
            Rem = Rem - B;
            finish( );
        }
    }
}
```

Figure 8:
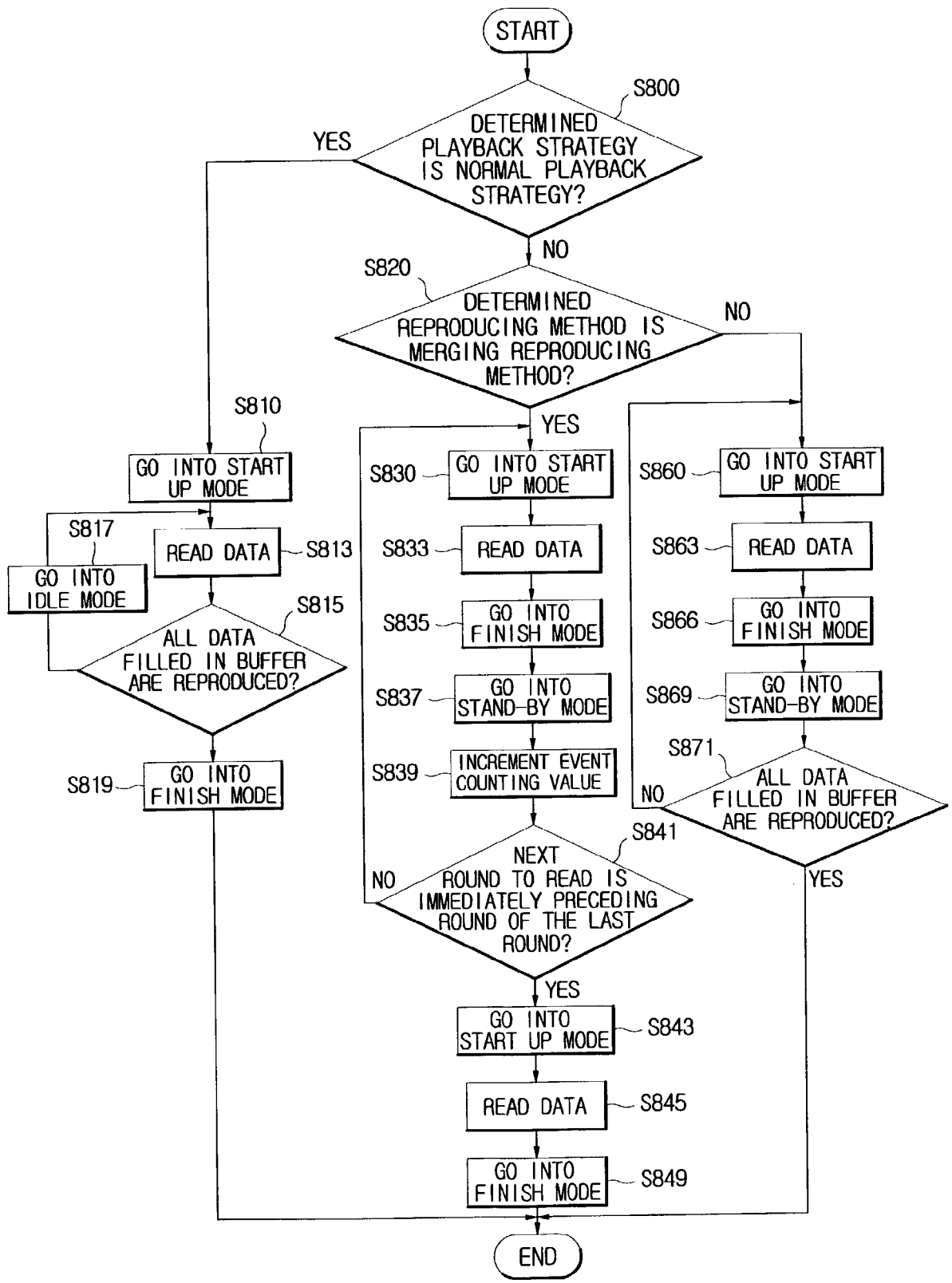
FIG. 8 is a flow diagram showing the steps of reproducing multimedia data consistent with the principles of the present invention.

FIG. 8 is a flow diagram showing the steps of reproducing multimedia data consistent with the principles of the present invention.

As mentioned above, before the data reproducing device reproduces multimedia data from a disk, it performs the process for choosing a playback strategy from either the Normal playback strategy or the Full Buffer playback strategy, and then the step for choosing a reproducing method from either the separating reproducing method or the merging reproducing method.

Referring to FIG. 8, the data reproducing process according to the present invention will be explained below.

At step 800, the data reproducing device examines whether the determined playback strategy is the Normal playback strategy. As mentioned above, the playback strategy may be determined by means of comparing each respective power consumption.

If the determined playback strategy is the Normal playback strategy by the examination result of step 800, the data reproducing device goes into start-up mode (step 810). Thereafter, in the read mode, it reads data from a disk, sends the data to buffer (step 813). At step 815, it examines if all data stored in the disk are read (step 815).

If all data stored in the disk are not read by the examination result of step 815, after the data reproducing device goes into idle mode (step 817), it proceeds to step 813 again. But, if all data stored in the disk are read by the examination result of step 815, the data reproducing device ends the data reproducing process.

If the determined playback strategy is not the Normal strategy by the examination result of step 800, the data reproducing device examines if the determined reproducing method is the merging reproducing method (step 820). The data reproducing device can determine the reproducing method with the above-mentioned formula (7).

If the determined reproducing method is the merging reproducing method by the examination result of step 820, the data reproducing device goes into start-up mode (step 830). Then in read mode, it reads data from a disk and sends the data to the buffer (step 833). After the data reproducing device has gone into finish mode (step 835), it goes into stand-by mode (step 837). At step 839, the data reproducing device increments event counting value one by one whenever retrieval of a round ends. Then, at step 841, the data reproducing device compares the incremented event counting value with the number of a plurality of rounds, and examines if the next round to be read is the immediately preceding round of the last round.

If the next round to be read is not the immediately preceding round of the last round by the examination result of step 841, it proceeds to step 830 again in order to execute the next round. However, if the next round to be read is the immediately preceding round of the last round by the examination result of step 841, the data reproducing device goes into start-up mode (step 843). At step 845, it reads all remaining data block from the disk by means of merging the last round with its immediately preceding round, and sends the read data to buffer. Then the data reproducing device goes into finish mode (step 849). By the above-mentioned step 830 through step 849, the data reproducing device can reproduce multimedia data by the merging reproducing method.

However, if the determined reproducing method is not the merging reproducing method (i.e., the separating reproducing method) by the examination result of step 820, the data reproducing device goes into start-up mode (step 860). Then in read mode, it reads data from a disk and sends the data to buffer (step 863). After the data reproducing device has gone into finish mode (step 866), it goes into stand-by mode (step 869). The data reproducing process in a round ends by step 860 through step 869. At step 871, the data reproducing device examines if the current round is the last round. If the current round is not the last round by the examination result of step 871, it proceeds to step 860 again in order to execute the next round. However, if the current round is the last round by the examination result of step 871, the step ends. By the above-mentioned step 860 through step 871, the data reproducing device can reproduce multimedia data by the separating reproducing method.

Hereinafter, power consumption according to various reproducing methods consistent with the principles of the present invention will be explained with reference to FIGS. 9A through 10D.

FIG. 9A through FIG. 9D are graphs showing the relationship between the buffer size and the power consumption when using IBM Microdrive DMDM-10340 consistent with the principles of the present invention, and FIG. 10A through FIG. 10D are graphs showing the relationship between the playback length and the power consumption when using IBM Microdrive DMDM-10340 and the same buffer size consistent with the principles of the present invention.

When using IBM Microdrive DMDM-10340, the start-up mode is 1 second long and consumes 0.858 Joule. The finish mode is 0.4 second long and consumes 0.7 Joule. The power consumption in steady state read operation is 0.924 Watt.

The X-axis and the Y-axis in FIG. 9A through FIG. 9D denotes buffer size and power consumption, respectively.

Figure 9A:
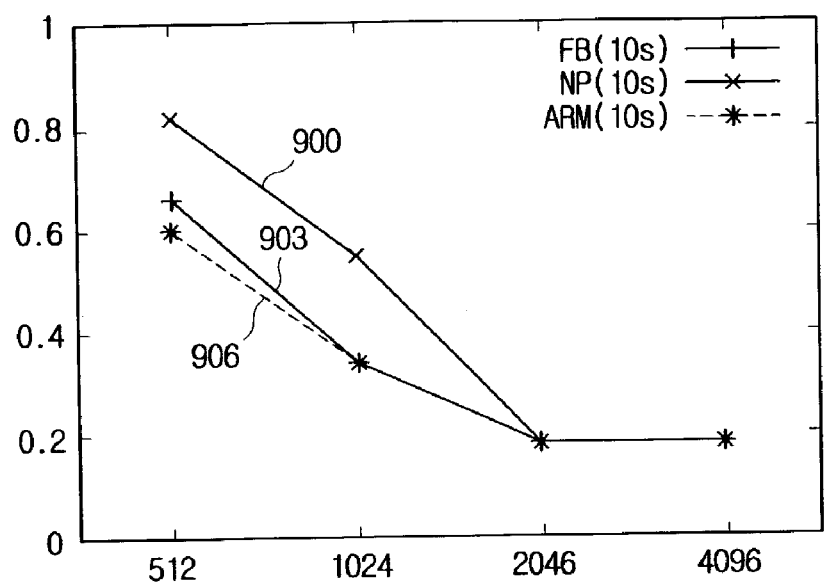
FIG. 9A through FIG. 9D are graphs showing the relationship between the buffer size and the power consumption when using IBM Microdrive DMDM-10340 consistent with the principles of the present invention.

Referring to FIG. 9A, three graphs 900, 903 and 906 regarding 10 second playback are plotted. One graph 900 shows the variation of power consumption in Full Buffering playback strategy due to the variation of buffer size. The other graph 903 shows the variation of power consumption in Normal playback strategy due to the variation of buffer size. Another graph 906 shows the variation of power consumption when merging the last round with its preceding one in Adaptive Round Merge due to the variation of buffer size.

Figure 9B:
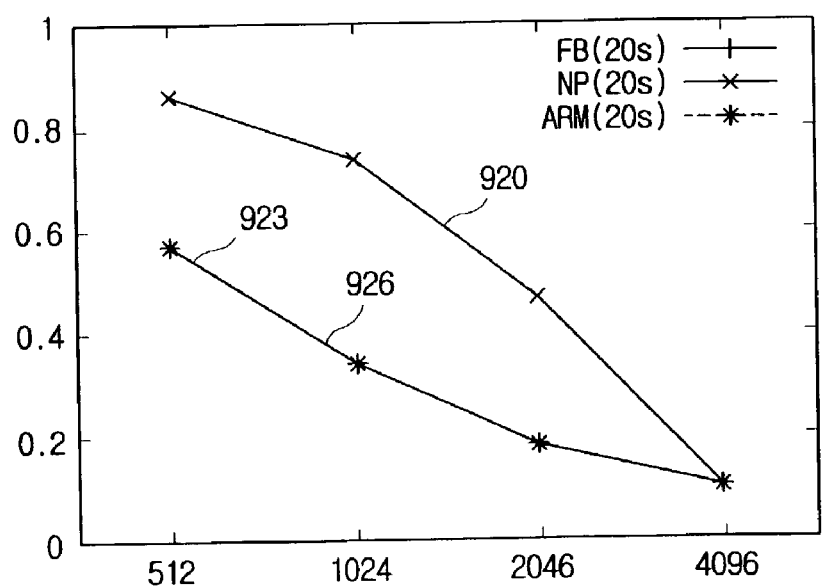

Referring to FIG. 9B, three graphs 920, 923 and 926 regarding 20 second playback are plotted. One graph 920 shows the variation of power consumption in Full Buffering playback strategy due to the variation of buffer size. The other graph 923 shows the variation of power consumption in Normal playback strategy due to the variation of buffer size. Another graph 926 shows the variation of power consumption when merging the last round with its preceding one in Adaptive Round Merge due to the variation of buffer size.

Figure 9C:
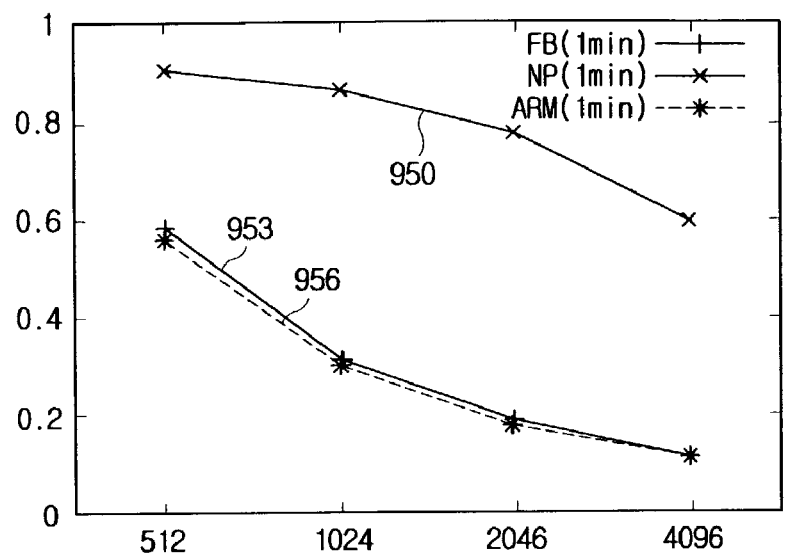

Referring to FIG. 9C, three graphs 950, 953 and 956 regarding 1 minute playback are plotted. One graph 950 shows the variation of power consumption in Full Buffering playback strategy due to the variation of buffer size. The other graph 953 shows the variation of power consumption in Normal playback strategy due to the variation of buffer size. Another graph 956 shows the variation of power consumption regarding merging the last round with its preceding one in Adaptive Round Merge due to the variation of buffer size.

Figure 9D:
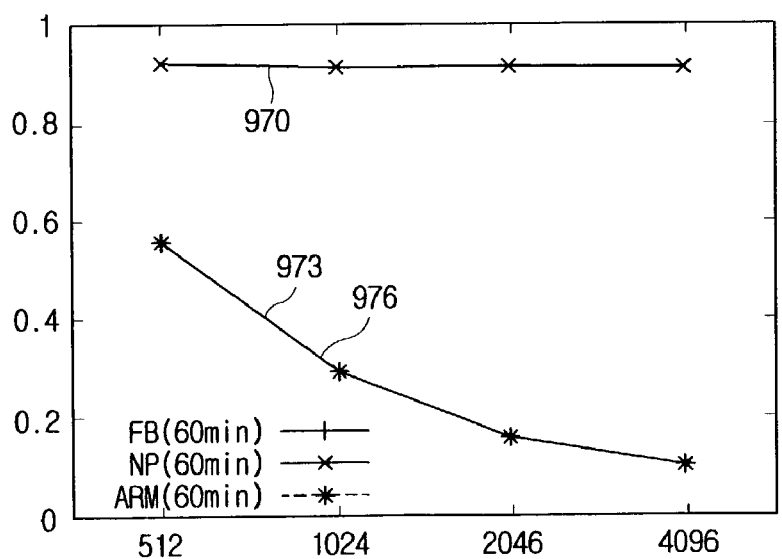

Referring to FIG. 9D, three graphs 970, 973 and 976 in case of 60 min playback are plotted. One graph 970 shows the variation of power consumption in Full Buffering playback strategy due to the variation of buffer size. The other graph 973 shows the variation of power consumption in Normal playback strategy due to the variation of buffer size. Another graph 976 shows the variation of power consumption in case of merging the last round with its preceding one in Adaptive Round Merge due to the variation of buffer size.

Referring to FIG. 9A through FIG. 9D, the power consumption is inversely proportional to the buffer size. That is, with the larger buffer size, the data reproducing device can acquire a larger amount of data in each round and subsequently power efficiency improves. With a 512 KByte buffer, merging the last round with its preceding one in the Adaptive Round Merge causes approximately 9% reduction in power consumption as opposed to the Full Buffering playback strategy.

As shown in FIG. 9A and FIG. 9B, in Normal playback strategy, effectiveness of using a larger buffer size greatly depends on the playback length. That is, with short playback, the larger buffer size improves power consumption activity. On the other hand, when playback is long, e.g., 1 minute or beyond, using the large buffer size (up to 4 MByte) does not result in any improvement in power consumption. However, when merging the last round with its preceding one in the Adaptive Round Merge, the larger buffer size improves power consumption activity at all times.

FIG. 10A through FIG. 10D are graphs showing the relationship between the playback length and the power consumption when using IBM Microdrive DMDM-10340 and the same buffer size consistent with the principles of the present invention.

The X-axis and the Y-axis in FIG. 10A through FIG. 10D denote playback length and power consumption, respectively.

Figure 10A:
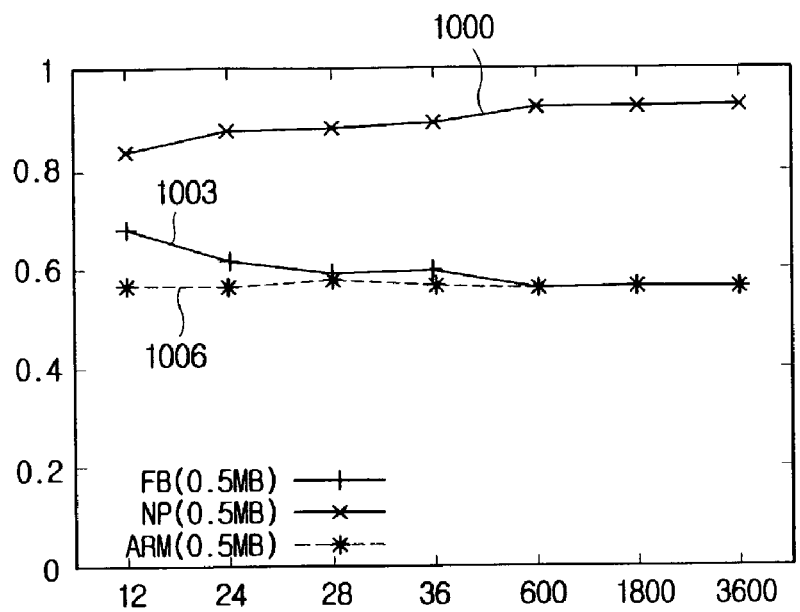
FIG. 10A through FIG. 10D are graphs showing the relationship between the playback length and the power consumption when using IBM Microdrive DMDM-10340 and the same buffer size consistent with the principles of the present invention.

Referring to FIG. 10A, three graphs 1000, 1003 and 1006 regarding a 0.5 MByte buffer size are plotted. One graph 1000 shows the variation of power consumption in Full Buffering playback strategy due to the variation of playback length. The other graph 1003 shows the variation of power consumption in Normal playback strategy due to the variation of playback length. Another graph 1006 shows the variation of power consumption when merging the last round with its preceding one in the Adaptive Round Merge due to the variation of playback length.

Figure 10B:
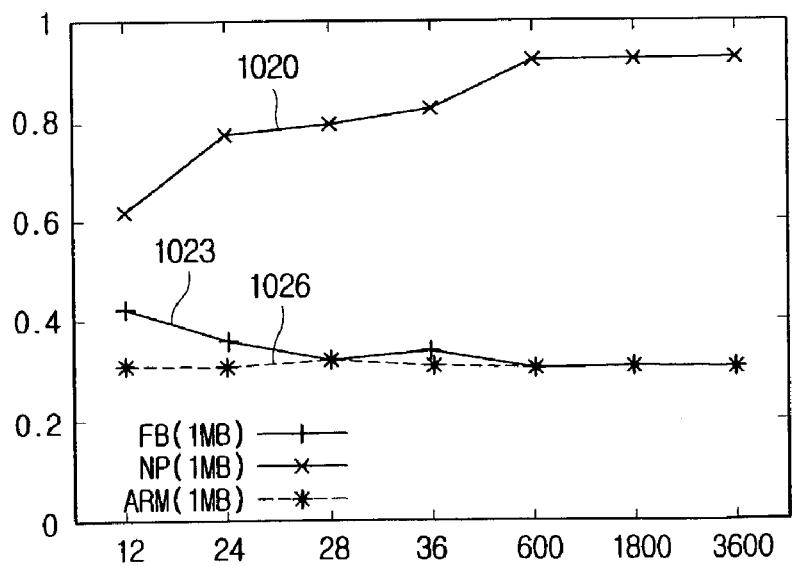

Referring to FIG. 10B, three graphs 1020, 1023 and 1026 regarding 1 MByte buffer size are plotted. One graph 1020 shows the variation of power consumption in Full Buffering playback strategy due to the variation of playback length. The other graph 1023 shows the variation of power consumption in Normal playback strategy due to the variation of playback length. Another graph 1026 shows the variation of power consumption when merging the last round with its preceding one in the Adaptive Round Merge due to the variation of playback length.

Figure 10C:
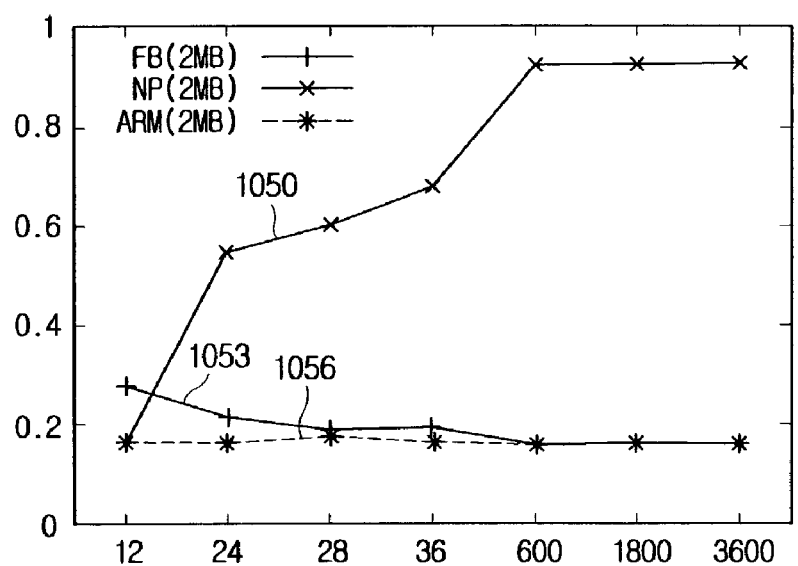

Referring to FIG. 10C, three graphs 1050, 1053 and 1056 regarding 2 MByte buffer size are plotted. One graph 1050 shows the variation of power consumption in Full Buffering playback strategy due to the variation of playback length. The other graph 1053 shows the variation of power consumption in Normal playback strategy due to the variation of playback length. Another graph 1056 shows the variation of power consumption when merging the last round with its preceding one in the Adaptive Round Merge due to the variation of playback length.

Figure 10D:
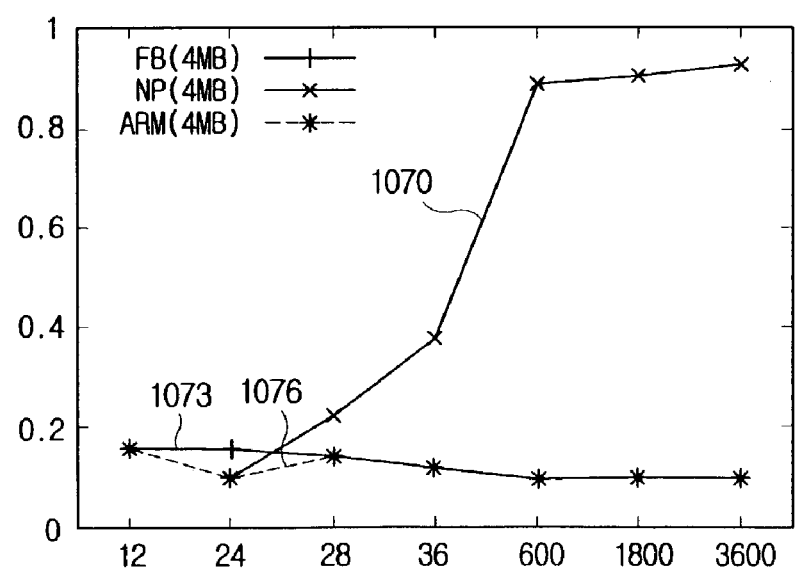

Referring to FIG. 10D, three graphs 1070, 1073 and 1076 regarding 4 MByte buffer size are plotted. One graph 1070 shows the variation of power consumption in Full Buffering playback strategy due to the variation of playback length. The other graph 1073 shows the variation of power consumption in Normal playback strategy due to the variation of playback length. Another graph 1076 shows the variation of power consumption when merging the last round with its preceding one in the Adaptive Round Merge due to the variation of playback length.

Referring to the above-mentioned FIG. 10A through FIG. 10D, in the Normal playback strategy, with the longer playback length, the power consumption has a tendency to increase because the data reproducing device consumes power continuously in the read mode. That is, in the Normal Playback strategy, since no stand-by mode exists, the power consumption rate converges to the power consumption rate of the read mode. However, in the Full Buffering and Adaptive Round Merge, the data reproducing device goes into stand-by mode when the buffer becomes full and remains in the stand-by mode until the buffer becomes empty. Therefore, the power consumption remains practically equal in spite of the longer playback length.

Also, the advantage of merging the last round with its preceding one in the Adaptive Round Merge becomes more obvious when the playback length is relatively short. With the playback length of 12, 24 and 36 seconds, the Adaptive Round Merge reduces the power consumption by 18%, 28% and 40% against Full Buffering playback strategy, respectively, with a 0.5 MByte Buffer. These values correspond to 9%, 15% and 23% with a 1 MByte buffer.

As mentioned above, the Full Buffering playback strategy regarding periods of the read mode and the stand-by mode with basic parameters is explained in this specification. When periods of the read mode and the stand-by mode are computed, by logical conclusion further parameters shown in this specification can be considered in order to compute more accurate periods of the read mode and the stand-by mode.

The present invention can provide a method and device for reproducing data from a storage medium (e.g., disk, tape and etc.) that retrieves data in low-power The present invention can also determine the data reproducing method having the minimum power consumption by comparing with the respective power consumption according to a respective data reproducing method before the data reproducing device reproduces data, and then reproduce data using the determined data reproducing method.

The present invention can also minimize power consumption regarding the unnecessary rotating of a disk by means of reading split data stored in a storage medium according to the size of an allotted buffer and size of multimedia data to be produced.

The present invention can also minimize the power consumption by means of going into stand-by mode when the buffer becomes full. In contrast, the conventional method consumes power because the spindle still rotates at full speed in idle mode until the buffer becomes empty.

The present invention can also reduce the power consumed for operation of spin up and spin down in the last round by means of determining whether or not to merge the last round with its immediately preceding round, when the data reproducing device retrieves the last round.

Although the present invention has been described in terms of various embodiments, it is not intended that the invention be limited to these embodiments. Modifications within the spirit and scope of the invention will be apparent to those having knowledge of the ordinary skill in the art.

What is claimed is:

1. A method for responding data in low-power, comprising the steps of:
    computing a first power consumption according to Normal playback strategy and a second power consumption according to Full Buffering playback strategy before starting the reproduction of data;
    determining a playback strategy having the least power consumption, by means of comparing the first power consumption according to the Normal playback strategy with the second power consumption according to the Full Buffering playback strategy;
    retrieving data from a storage medium corresponding to the determined playback strategy; and
    reproducing the retrieved data by the determined playback strategy only,
    wherein the Normal playback strategy includes a start-up mode, a read mode, an idle mode, and a finish mode, and the Full Buffering playback strategy includes a start-up mode, a read node, and a finish mode.

2. The method of claim 1, wherein the Full Buffering playback strategy in order to retrieve data from a storage medium in a round on a data reproducing device having a buffer, comprises the steps of:
    a) performing a preceding operation for retrieving data when a reproducing command is inputted;
    b) retrieving data from the storage medium;
    c) sending the retrieved data to the buffer;
    d) stopping retrieving data when the buffer becomes full;
    e) executing spin down;
    f) stopping rotating of a motor while the data filling the buffer are reproduced; and
    g) requesting the reproducing command when the buffer becomes empty.

3. The method of claim 1, wherein the Full Buffering playback strategy in order to retrieve data from a storage medium in a round on a data reproducing device having a buffer group comprising a plurality of buffers, comprises the steps of:
    a) performing a preceding operation for retrieving data when a reproducing command is inputted;
    b) retrieving data from the storage medium;
    c) sending the retrieved data to a first buffer selected from the buffer group while the first buffer becomes full;
    d) sending the retrieved data subsequently to any other buffer from the buffer group while the data filling the first buffer are reproduced;
    e) executing spin down if all of buffers in the buffer group become full;
    f) stopping rotating of a motor white an arbitrary buffer in the buffer group becomes empty; and
    g) requesting the reproducing command when the arbitrary buffer in the buffer group becomes empty.

4. The method of claim 1, wherein the first power consumption is computed by the formula as defined below:

$$P_N = P_s + P_f + \alpha\left(\frac{B^*}{R-r} + \frac{Lr-B}{r}\right)$$

where $P_N$ is power consumption according to the Normal playback strategy, $P_s$ is power consumption in the start-up mode, $P_f$ is power consumption in the finish mode, $\alpha$ is power consumption rate in the read mode, $B^*$ is buffer size, $R$ is the maximum transfer rate from the storage medium, $r$ is playback rate from the buffer, $L$ is playback length, and $B$ is data size retrieved during a round.

5. The method of claim 1, wherein the second power consumption is computed by the formula as defined below:

$$P_P = \frac{Lr}{\frac{B^*R}{R-r}}E\left(P_s + P_f + \alpha\frac{B^*}{R-r}\right) + (P_s + P_f + \alpha T'_p)EI$$

where $P_p$ is power consumption according to the Full Buffering playback strategy, $P_s$ is power consumption in the start-up mode, $P_f$ is power consumption in the finish mode, $\alpha$ is power consumption rate in the read mode, $B^*$ is buffer size, $R$ is the maximum transfer rate from the storage medium, $r$ is playback rate from the buffer, $L$ is playback length, $T'_p$ is the length of active mode in the last round, and $I$ is an index function which is 0 if the surplus equals zero (0) when L by length of a round but 1 other wise.

6. The method of claim 2, wherein, the data size retrieved from the storage medium during the round, B, in the step b) is computed by the formula as defined below:

$$B = \begin{cases} T_P ER, & \text{if } T_P D \frac{B^*}{R-r} \\ \frac{B^*}{R-r}R + \left(T_p - \frac{B^*}{R-r}\right)r, & \text{otherwise} \end{cases}$$

where $T_P$ is the length of active mode in each round, $R$ is to maximum transfer rate from the storage medium, $r$ is playback rate from the buffer, and $B^*$ is buffer size.

7. The method of claim 3, wherein, the data size retrieved front the storage medium during the round, B, in the step b) is computed by the formula as defined below:

$$B = \begin{cases} T_P ER, & \text{if } T_P D \frac{B^*}{R-r} \\ \frac{B^*}{R-r}R + \left(T_p - \frac{B^*}{R-r}\right)r, & \text{otherwise} \end{cases}$$

where $T_p$ is the length of active mode in each round, $R$ is the maximum transfer rate from the storage medium, $r$ is playback rate from the buffer, and $B^*$ is buffer size.

8. The method of claim 6, wherein the data size retrieved during a single round B is greater than the minimum data size retrieved during a round capable of being reproduced in low-power, $B_{min}$ computed by the formula as defined below;

$$B_{min} = \frac{(R-r)s \ rs \ [T_s + T_f]}{R - 2r}$$

where R is the maximum transfer rate from the storage medium, r is playback rate from the buffer, $T_s$ is the length of star-up mode in each round, and $T_f$ is the length of finish mode in each round.

9. The method of claim 2, further comprising the step of determining whether or not to merge a last round with any preceding round in a plurality of rounds.

10. The method of claim 3, further comprising the step of determining whether or not to merge a last round with any preceding round in a plurality of rounds.

11. The method of claim 9, wherein the result of determining whether or not to merge the last round in a plurality of rounds with its preceding round is indicated by the si P* of and computed by the formula as defined below:

$$P^* = P_s + P_f + \alpha \frac{B_1}{R} - \alpha \frac{B_1}{r}$$

where $B_1$ is the number of remaining data blocks retrieved in the last round.

12. The method of claim 11, wherein the number of remaining data blocks retrieved in the last round, $B_1$, is computed by the formula as defined below:

$$B_1 = Lr - N \frac{B^*}{R-r} R$$

where L is playback length, r is playback rate from the buffer, N is the number of rounds of the same length B* is buffer size, and R is the maximum transfer rate from the storage medium.

13. The method of claim 9, wherein the step of determining whether or not to merge the last round with any preceding round in a plurality of rounds, comprises the steps of;
counting the number of preceding rounds from the last round;
computing the split data size by means of dividing the data size retrieved during a round by the number of preceding rounds; and
retrieving data from the storage medium by merging the split amount of data with the preceding rounds, respectively.

14. A device for reproducing data in low-power, comprising;
a reading part for reading data from a storage medium;
a buffer for temporarily storing the data received from said reading part; and
an output part for reproducing the data stored in said buffer according to predetermined playback rate,
wherein said reading part reads the data from the storage medium according to a method comprising:
computing a first power consumption according to Normal playback strategy and a second power consumption according to Full Buffering playback strategy before starting the reproduction of data;
determining a playback strategy having the least power consumption, by means of comparing the first power consumption according to the Normal playback strategy with the second power consumption according to the Full Buffering playback strategy;
retrieving data from a storage medium corresponding to the determined playback strategy; and
reproducing the retrieved data by the determined playback strategy only,
wherein the Normal playback strategy includes a start-up mode, a read mode, an idle mode, and a finish mode, and the Full Buffering playback strategy includes a start-up mode, a read mode, and a finish mode.

15. A method for reproducing data stored in a storage medium in low-power, comprising the steps of:
a) performing a preceding operation for retrieving data when a reproducing command is inputted;
b) retrieving data from the storage medium;
e) sending the retrieved data to a buffer;
d) stopping the retrieving of data when the buffer becomes full;
e) executing spin down;
f) stopping rotating of a motor while the data filling the buffer are reproduced;
g) requesting the reproducing command when the buffer becomes empty; and
h) repeating steps a)–g) by the number of rounds when a plurality of rounds exist,
wherein in Full Buffering playback strategy as the method for reproducing data further comprises determining whether or not to merge the last round with any preceding round in a plurality of rounds.

16. The method of claim 15, wherein the data size retrieved B, in the step b) is computed by the formula as defined below:

$$B = \begin{cases} T_p ER, & \text{if } T_p D \frac{B^*}{R-r} \\ \frac{B^*}{R-r} R + \left(T_p - \frac{B^*}{R-r}\right) r, & \text{otherwise} \end{cases}$$

where $T_p$ is the length of active mode in each round, R is the maximum transfer rate from the storage medium, r is playback rate from the buffer, and B* is buffer size.

17. The method of claim 16, wherein the data size retrieved during a single round, B is greater than the minimum data size retrieved during a round capable of being reproduced in low-power, $B_{min}$ computed by the formula as defined below:

$$B_{min} = \frac{(R-r)s \ rs \ [T_s + T_f]}{R - 2r}$$

where R is the maximum transfer rate from the storage medium, r is playback rate from the buffer, B* is buffer size, $T_s$ is the length of start-up mode in each round, and $T_f$ is the length of finish mode in each round.

18. The method of claim 15, wherein the power consumption according to the method for reproducing data is computed by the formula as defined below:

$$P_p = \frac{Lr}{\frac{B^*R}{R-r}} E\left(P_s + P_f + \alpha\frac{B^*}{R-r}\right) + (P_s + P_f + \alpha T'_p)EI$$

where $P_p$ is power consumption according to Full Buffering playback strategy, $P_s$ is power consumption in start-up mode, $P_f$ is power consumption in finish mode, $\alpha$ is power consumption rate in read mode, $B^*$ is buffer size, R is the maximum transfer rate from the storage medium, r is playback rate from the buffer, L is playback length, $T_p$ is the length of active mode in the last round, and I is an index function that is 0 if the surplus equals zero (0) when L is divided by length of a round but 1 otherwise.

19. The method of claim 15 wherein the result of determining whether or not to merge the last round in a plurality of rounds with its preceding round is indicated by the sign of P* and computed by the formula as defined below:

$$P^* = P_s + P_f + \alpha\frac{B_1}{R} - \alpha\frac{B_1}{r}$$

where $B_1$ is the number of remaining data blocks retrieved in the last round.

20. The method of claim 19, wherein the number of remaining data blocks retrieved in the last round, $B_1$, is computed by the formula as defined below:

$$B_1 = Lr - N\frac{B^*}{R-r}R$$

where L is playback length r is playback rate from the buffer, N is the number of rounds of the same length, B* size, and R is the maximum transfer rate from the storage medium.

21. The method of claim 15, wherein the step of determining whether or not to merge the last round with any preceding round in a plurality of rounds, comprises the steps of;
 counting the number of preceding rounds from the last round;
 computing the split data size by means of dividing the data size retrieved during a round by the number of preceding rounds; and
 retrieving data from the storage medium by merging the split amount of data with the preceding rounds, respectively.

22. The method of claim 15, wherein the method for reproducing data removes an idle mode by means of setting a time-out value as zero.

23. A device for reproducing data in low-power, comprising:
 a reading part for reading data from a storage medium;
 a buffer for temporarily storing the data received from said reading part; and
 an output part for reproducing the data stored in said buffer according to a predetermined playback rate,
 wherein said reading part reads the data from the storage medium according to a method comprising;
 a) performing a preceding operation for retrieving data when a reproducing command is inputted;
 b) retrieving data from the storage medium;
 c) sending the retrieved data to a buffer;
 d) stopping the retrieving of data when the buffer becomes full;
 e) executing spin down;
 f) stopping rotating of a motor while the data filling the buffer are reproduced;
 g) requesting the reproducing command when the buffer becomes empty; and
 h) repeating steps a)–g) by the number of rounds when a plurality of rounds exist,
 wherein Full Buffering playback strategy as the method for reproducing data further comprises the step of determining whether or not to merge the last round with any preceding round in a plurality of rounds.

* * * * *